US007823214B2

(12) United States Patent
Rubinstein et al.

(10) Patent No.: US 7,823,214 B2
(45) Date of Patent: Oct. 26, 2010

(54) ACCESSORY AUTHENTICATION FOR ELECTRONIC DEVICES

(75) Inventors: Jonathan Jake Rubinstein, San Francisco, CA (US); Anthony M. Fadell, Portola Valley, CA (US); Jesse L. Dorogusker, Menlo Park, CA (US); Mitchell Adler, Cupertino, CA (US); John Wesley Archibald, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 1094 days.

(21) Appl. No.: 11/051,499

(22) Filed: Feb. 3, 2005

(65) Prior Publication Data

US 2006/0156415 A1 Jul. 13, 2006

Related U.S. Application Data

(60) Provisional application No. 60/642,340, filed on Jan. 7, 2005.

(51) Int. Cl.
*G08B 29/00* (2006.01)
(52) U.S. Cl. .............................. 726/34; 726/17; 726/21; 713/170
(58) Field of Classification Search .................. 726/27, 726/17, 19, 21, 34; 320/106; 455/522, 557, 455/571, 572, 574; 713/323, 324, 168, 180, 713/176; 710/62, 74
See application file for complete search history.

(56) References Cited

U.S. PATENT DOCUMENTS 4,673,861 A 6/1987 Dubovsky et al.

4,850,899 A 7/1989 Maynard (Continued)

FOREIGN PATENT DOCUMENTS

EP 1104150 A2 5/2001

(Continued)

OTHER PUBLICATIONS

Altec Lansing, "inMotion Users Guide," Corp. Headquarters, 535 Rte.6 & 209, Milford, PA 18337.

(Continued)

*Primary Examiner*—Kimyen Vu
*Assistant Examiner*—Edward Zee
(74) *Attorney, Agent, or Firm*—Townsend and Townsend and Crew LLP

(57) ABSTRACT

Improved techniques to control utilization of accessory devices with electronic devices are disclosed. The improved techniques can use cryptographic approaches to authenticate electronic devices, namely, electronic devices that interconnect and communicate with one another. One aspect pertains to techniques for authenticating an electronic device, such as an accessory device. Another aspect pertains to provisioning software features (e.g., functions) by or for an electronic device (e.g., a host device). Different electronic devices can, for example, be provisioned differently depending on different degrees or levels of authentication, or depending on manufacturer or product basis. Still another aspect pertains to using an accessory (or adapter) to convert a peripheral device (e.g., USB device) into a host device (e.g., USB host). The improved techniques are particularly well suited for electronic devices, such as media devices, that can receive accessory devices. One example of a media device is a media player, such as a hand-held media player (e.g., music player), that can present (e.g., play) media items (or media assets).

31 Claims, 25 Drawing Sheets

U.S. PATENT DOCUMENTS

| | | | |
|---|---|---|---|
| 4,916,334 A * | 4/1990 | Minagawa et al. | 326/103 |
| 4,924,216 A | 5/1990 | Leung | |
| 4,938,483 A | 7/1990 | Yavetz | |
| 5,041,025 A | 8/1991 | Haitmanek | |
| 5,055,069 A | 10/1991 | Townsend et al. | |
| 5,080,603 A | 1/1992 | Mouissie | |
| 5,104,243 A | 4/1992 | Harding | |
| 5,108,313 A | 4/1992 | Adams | |
| 5,150,031 A | 9/1992 | James et al. | |
| 5,186,646 A | 2/1993 | Pederson | |
| 5,247,138 A | 9/1993 | Landmeier | |
| 5,277,624 A | 1/1994 | Champion | |
| 5,471,128 A | 11/1995 | Patino et al. | |
| 5,525,981 A | 6/1996 | Abernethy | |
| 5,586,893 A | 12/1996 | Mosquera | |
| 5,592,588 A | 1/1997 | Reekes et al. | |
| 5,618,045 A | 4/1997 | Kagan et al. | |
| 5,648,712 A | 7/1997 | Hahn | |
| 5,660,558 A | 8/1997 | Osanai et al. | |
| 5,727,866 A | 3/1998 | Kraines et al. | |
| 5,732,361 A * | 3/1998 | Liu | 455/569.2 |
| 5,754,027 A | 5/1998 | Oglesbee et al. | |
| 5,830,001 A | 11/1998 | Kinoshita | |
| 5,835,862 A * | 11/1998 | Nykanen et al. | 455/558 |
| 5,845,217 A | 12/1998 | Lindell et al. | |
| 5,859,522 A * | 1/1999 | Theobald | 320/106 |
| 5,901,049 A | 5/1999 | Schmidt et al. | |
| 5,964,847 A | 10/1999 | Booth et al. | |
| 5,975,957 A | 11/1999 | Noda et al. | |
| 6,007,372 A | 12/1999 | Wood | |
| 6,012,105 A | 1/2000 | Rubbmark et al. | |
| 6,031,797 A | 2/2000 | Van Ryzint et al. | |
| 6,053,773 A | 4/2000 | Wu | |
| 6,078,402 A | 6/2000 | Fischer et al. | |
| 6,078,789 A | 6/2000 | Bodenmann et al. | |
| 6,125,455 A | 9/2000 | Yeo | |
| 6,130,518 A | 10/2000 | Gabehart et al. | |
| 6,139,373 A | 10/2000 | Ward et al. | |
| 6,154,773 A | 11/2000 | Roberts et al. | |
| 6,154,798 A | 11/2000 | Lin et al. | |
| 6,161,027 A | 12/2000 | Poirel | |
| 6,169,387 B1 | 1/2001 | Kaib | |
| 6,178,514 B1 | 1/2001 | Wood | |
| 6,184,652 B1 | 2/2001 | Yang | |
| 6,184,655 B1 | 2/2001 | Malackowski | |
| 6,188,265 B1 * | 2/2001 | Liu et al. | 327/390 |
| 6,203,345 B1 | 3/2001 | Roque et al. | |
| 6,204,637 B1 | 3/2001 | Rengan | |
| 6,206,480 B1 | 3/2001 | Thompson | |
| 6,211,581 B1 | 4/2001 | Farrant | |
| 6,211,649 B1 | 4/2001 | Matsuda | |
| 6,224,420 B1 | 5/2001 | Nishio et al. | |
| 6,230,205 B1 | 5/2001 | Garrity et al. | |
| 6,234,827 B1 | 5/2001 | Nishio et al. | |
| 6,252,380 B1 | 6/2001 | Koenck | |
| 6,261,109 B1 | 7/2001 | Liu et al. | |
| 6,267,623 B1 | 7/2001 | Hisamatsu | |
| 6,268,845 B1 | 7/2001 | Pariza et al. | |
| 6,271,605 B1 | 8/2001 | Carkner et al. | |
| 6,280,251 B1 | 8/2001 | Nishio et al. | |
| 6,283,789 B1 | 9/2001 | Tsai | |
| 6,304,764 B1 | 10/2001 | Pan | |
| 6,314,479 B1 | 11/2001 | Frederick et al. | |
| 6,316,916 B2 | 11/2001 | Bohne | |
| 6,319,061 B1 | 11/2001 | Chen et al. | |
| 6,322,396 B1 | 11/2001 | Kuan | |
| 6,344,727 B1 | 2/2002 | Desai et al. | |
| 6,353,894 B1 | 3/2002 | Pione | |
| 6,354,713 B1 | 3/2002 | Leifer et al. | |
| 6,358,089 B1 | 3/2002 | Kuroda et al. | |
| 6,372,974 B1 | 4/2002 | Gross et al. | |
| 6,385,596 B1 | 5/2002 | Wiser et al. | |
| 6,394,905 B1 | 5/2002 | Takeda et al. | |
| 6,429,622 B1 | 8/2002 | Svensson | |
| 6,429,879 B1 | 8/2002 | Sturgeon et al. | |
| 6,431,915 B1 | 8/2002 | Ko | |
| 6,453,371 B1 | 9/2002 | Hampson et al. | |
| 6,454,592 B2 | 9/2002 | Takagi | |
| 6,461,173 B1 | 10/2002 | Mizuno et al. | |
| 6,463,473 B1 | 10/2002 | Gubbi | |
| 6,464,542 B1 | 10/2002 | Lee | |
| 6,468,110 B2 | 10/2002 | Fujino et al. | |
| 6,478,603 B1 | 11/2002 | Wu | |
| 6,483,428 B1 | 11/2002 | Fish et al. | |
| 6,485,328 B1 | 11/2002 | Wu | |
| 6,489,751 B2 | 12/2002 | Small et al. | |
| 6,505,160 B1 | 1/2003 | Levy et al. | |
| 6,524,119 B2 | 2/2003 | Kato et al. | |
| 6,526,287 B1 * | 2/2003 | Lee | 455/556.1 |
| 6,558,201 B1 | 5/2003 | Begley et al. | |
| 6,577,877 B1 | 6/2003 | Charlier et al. | |
| 6,589,076 B1 | 7/2003 | Davis et al. | |
| 6,591,085 B1 | 7/2003 | Grady | |
| 6,608,264 B1 | 8/2003 | Fouladpour | |
| 6,608,399 B2 | 8/2003 | McConnell et al. | |
| 6,614,232 B1 | 9/2003 | Mukai | |
| 6,616,473 B2 | 9/2003 | Kamata et al. | |
| 6,629,197 B1 | 9/2003 | Bhogal et al. | |
| 6,642,629 B2 | 11/2003 | DeLeeuw | |
| 6,643,777 B1 * | 11/2003 | Chu | 726/16 |
| 6,653,813 B2 | 11/2003 | Khatri | |
| 6,663,420 B1 | 12/2003 | Xiao | |
| 6,665,803 B2 | 12/2003 | Lunsford et al. | |
| 6,674,995 B1 | 1/2004 | Meyers et al. | |
| 6,697,944 B1 | 2/2004 | Jones et al. | |
| 6,724,339 B2 | 4/2004 | Conway et al. | |
| 6,725,061 B1 * | 4/2004 | Hutchison et al. | 455/557 |
| 6,728,546 B1 | 4/2004 | Peterson et al. | |
| 6,728,729 B1 | 4/2004 | Jawa et al. | |
| 6,742,061 B1 | 5/2004 | Hellberg | |
| 6,747,859 B2 | 6/2004 | Walbeck et al. | |
| 6,754,468 B1 | 6/2004 | Sieben et al. | |
| 6,761,635 B2 | 7/2004 | Hoshino et al. | |
| 6,774,939 B1 | 8/2004 | Peng | |
| 6,776,626 B2 | 8/2004 | Huang et al. | |
| 6,776,660 B1 | 8/2004 | Kubota et al. | |
| 6,776,665 B2 | 8/2004 | Huang | |
| 6,799,226 B1 | 9/2004 | Robbin et al. | |
| 6,801,964 B1 | 10/2004 | Mahdavi | |
| 6,813,528 B1 | 11/2004 | Yang | |
| 6,816,376 B2 | 11/2004 | Bright et al. | |
| 6,830,160 B2 | 12/2004 | Risolia | |
| 6,859,538 B1 | 2/2005 | Voltz | |
| 6,859,854 B2 | 2/2005 | Kwong | |
| 6,879,843 B1 | 4/2005 | Kim | |
| 6,928,295 B2 * | 8/2005 | Olson et al. | 455/522 |
| 6,931,266 B2 * | 8/2005 | Miyoshi et al. | 455/572 |
| 6,931,456 B2 | 8/2005 | Payne et al. | |
| 6,939,177 B2 | 9/2005 | Kato et al. | |
| 6,991,483 B1 | 1/2006 | Milan et al. | |
| 7,004,787 B2 | 2/2006 | Milan | |
| 7,050,783 B2 * | 5/2006 | Curtiss et al. | 455/404.1 |
| 7,054,888 B2 | 5/2006 | LaChapelle et al. | |
| 7,062,261 B2 * | 6/2006 | Goldstein et al. | 455/419 |
| 7,108,560 B1 | 9/2006 | Chou et al. | |
| 7,127,678 B2 | 10/2006 | Bhesania et al. | |
| 7,127,879 B2 | 10/2006 | Zhu et al. | |
| 7,167,112 B2 | 1/2007 | Andersen et al. | |
| 7,167,935 B2 | 1/2007 | Hellberg | |
| 7,187,947 B1 | 3/2007 | White et al. | |
| 7,187,948 B2 * | 3/2007 | Alden | 455/557 |
| 7,215,042 B2 | 5/2007 | Yan | |
| 7,254,708 B2 | 8/2007 | Silvester | |
| 7,281,214 B2 | 10/2007 | Fadell | |

| | | |
|---|---|---|
| 7,293,122 B1 | 11/2007 | Schubert et al. |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 | 12/2007 | Park et al. |
| 7,305,254 B2 * | 12/2007 | Findikli ............... 455/557 |
| 7,305,506 B1 | 12/2007 | Lydon et al. |
| 7,441,062 B2 | 10/2008 | Novotney et al. |
| 7,454,019 B2 | 11/2008 | Williams |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2002/0002035 A1 | 1/2002 | Sim et al. |
| 2002/0010759 A1 | 1/2002 | Hitson et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0173273 A1 | 11/2002 | Spurgat et al. |
| 2002/0174269 A1 | 11/2002 | Spurgat et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090998 A1 | 5/2003 | Chen |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0220988 A1 * | 11/2003 | Hymel ............... 709/220 |
| 2003/0225765 A1 | 12/2003 | Frieden et al. |
| 2003/0236075 A1 | 12/2003 | Johnson et al. |
| 2003/0237043 A1 | 12/2003 | Novak et al. |
| 2004/0003300 A1 | 1/2004 | Malueg et al. |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0090998 A1 | 5/2004 | Chen |
| 2004/0103223 A1 | 5/2004 | Gabehart et al. |
| 2004/0116005 A1 | 6/2004 | Choi |
| 2004/0162029 A1 | 8/2004 | Grady |
| 2004/0164708 A1 * | 8/2004 | Veselic et al. ............... 320/132 |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2005/0001589 A1 | 1/2005 | Edington et al. |
| 2005/0001629 A1 | 1/2005 | Chen |
| 2005/0014119 A1 | 1/2005 | Rudakov |
| 2005/0014531 A1 * | 1/2005 | Findikli ............... 455/557 |
| 2005/0014536 A1 | 1/2005 | Grady |
| 2005/0015355 A1 | 1/2005 | Heller et al. |
| 2005/0022212 A1 | 1/2005 | Bowen |
| 2005/0135790 A1 | 6/2005 | Hutten |
| 2005/0149213 A1 | 7/2005 | Guzak et al. |
| 2005/0181756 A1 | 8/2005 | Lin |
| 2005/0207726 A1 | 9/2005 | Chen |
| 2005/0239333 A1 | 10/2005 | Watanabe et al. |
| 2005/0239445 A1 | 10/2005 | Karaoguz et al. |
| 2005/0240705 A1 | 10/2005 | Novotney et al. |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0088228 A1 | 4/2006 | Marriott et al. |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0184456 A1 | 8/2006 | de Janasz |
| 2006/0258289 A1 | 11/2006 | Dua |
| 2007/0056012 A1 | 3/2007 | Kwon et al. |
| 2007/0056013 A1 | 3/2007 | Duncan |
| 2007/0070856 A1 | 3/2007 | Tebele |
| 2007/0080823 A1 | 4/2007 | Fu et al. |
| 2007/0083750 A1 | 4/2007 | Miura et al. |
| 2007/0083814 A1 | 4/2007 | Wilbrink et al. |
| 2007/0086724 A1 | 4/2007 | Grady et al. |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0226384 A1 | 9/2007 | Robbin et al. |

FOREIGN PATENT DOCUMENTS

| | | |
|---|---|---|
| EP | 1498899 A1 | 1/2005 |
| EP | 1594319 A1 | 11/2005 |
| EP | 1672613 A2 | 6/2006 |
| GB | 2405718 | 3/2005 |
| JP | 07-176351 A | 7/1995 |
| JP | 10-321302 A | 4/1998 |
| JP | 10-334993 A | 12/1998 |
| JP | 11-288420 A | 10/1999 |
| JP | 2000-214953 A | 8/2000 |
| JP | 2000-223215 A | 8/2000 |
| JP | 2000-223216 A | 8/2000 |
| JP | 2000-223218 A | 8/2000 |
| JP | 2001-035603 A | 2/2001 |
| JP | 2001-69165 A | 3/2001 |
| JP | 2001-196133 A | 7/2001 |
| JP | 2001-230021 A | 8/2001 |
| JP | 2001-332350 A | 11/2001 |
| JP | 2002-025720 A | 1/2002 |
| JP | 2002-140304 A | 5/2002 |
| JP | 2002-203641 A | 7/2002 |
| JP | 2002-245719 A | 8/2002 |
| JP | 2002-252566 A | 9/2002 |
| JP | 3090747 U | 10/2002 |
| JP | 2002-342659 A | 11/2002 |
| JP | 2002-374447 A | 12/2002 |
| JP | 2003-017165 A | 1/2003 |
| JP | 2003-032351 A | 1/2003 |
| JP | 2003-058430 A | 2/2003 |
| JP | 2003-274386 A | 9/2003 |
| JP | 2004-078538 A | 3/2004 |
| JP | 2004-259280 A | 9/2004 |
| WO | WO 99/26330 | 5/1999 |
| WO | WO 00/39907 | 7/2000 |
| WO | WO 00-42797 A1 | 7/2000 |
| WO | WO 00-60450 A1 | 10/2000 |
| WO | WO 02-49314 A2 | 6/2002 |
| WO | WO 03-036541 A1 | 5/2003 |
| WO | WO 03-036957 A1 | 5/2003 |
| WO | WO 03/073688 | 9/2003 |

| | | | |
|---|---|---|---|
| WO | WO 2004-084413 A2 | 9/2004 |
| WO | WO 2004-095772 A1 | 11/2004 |
| WO | WO 2004-112311 A1 | 12/2004 |
| WO | WO 2005-119463 A2 | 12/2005 |
| WO | WO 2006-080957 A2 | 8/2006 |

OTHER PUBLICATIONS

"ipodDock/iPod Cradle," www.bookendzdocks.com/bookendz/dock_cradle.htm, downloaded Feb. 27, 2003.

"Introduction to Public Key Cryptography," Oct. 9, 1998, printed from http://developer.netscape.com/docs/manuals/security/pkin/contents.htm on Oct. 6, 2004.

Brentrup, "Public Key Cryptography Demystified," Campus Technology, printed from http://www.campus-technology.com/article.asp?id=7626 on Oct. 6, 2004.

Whittle, "Public Key Authentication Framework: Tutorial," First Principles Consulting, Jun. 2, 1996.

Belkin iPod Voice Recorder, Product Specification Sheet, printed Jun. 16, 2004.

iPod Classic User's Guide, acquired from apple.com, 2002; 44 pages.

iPod nano Features Guide, acquired from apple.com, 2008; 72 pages.

iPod touch User's Guide, acquired from apple.com, 2008, 120 pages.

MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. 2 pages.

MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. 2 pages.

"Universal Serial Bus Specification—Rev 2.0," Chapter 6, Compaq Hewlett-Packard, Apr. 27, 2000, pp. 85, 99-100.

"A Serial Bus on Speed Diagram: Getting Connected with FireWire", downloaded Oct. 16, 2001, PC Magazine: PC Tech (a Serial Bus on Speed), wysiwyg://51/http://www.zdnet.com/pctech/content/18/10/tu1810.007.html.

"Cables to Go", download Oct. 16, 2001, http://www.cablestogo.com/product.asp?cat%5Fid=601&sku=27028.

"ExpressBus™ FU010 User Guide Packing Checklist", Belkin Components, 2006.

"FireWire Connector", downloaded Oct. 16, 2001, wysiwyg://76/http://developer.apple.com/...es/Macintosh_CPUs-G3/ibook/ibook-27.html.

"FireWire", downloaded Oct. 16, 2001, wysiwyg://42/http://developer.apple.com/hardware/FireWire.

"How to Connect Your Computer, PC Hardware", downloaded Oct. 16, 2001, http:///www.scar.utoronto.ca/~ccweb/faculty/connect-howto.html.

"IEEE 1394/USB Comparison", downloaded Oct. 16, 2001, www.genitech.com.au/Library/TechSupport/infobits/firewire_vs_usb.htm.

"Making USB Work", downloaded Oct. 16, 2001, PC Magazine: PC Tech (Making USB Work) wysiwyg://55/http://www.zdnet.com/pcmag/pctech/content/18/04/tu1804.001.html.

"PMC FW2 IEEE1394 FireWire Controller", downloaded Oct. 16, 2001, http://www.bvmltd.co.uk/PMCfw2ds.html.

"Why FireWire is Hot!Hot!Hot!", downloaded Oct. 16, 2001, "Impact.FireWire.SideBar", http://www.vxm.com/21R.35.html.

Ian Fried, "FireWire poised to become ubiquitous", downloaded Oct. 16, 2001, CNET News.com, 1394 Trade Association: Press, wysiwyg://32/http://1394ta.org/Press/2001Press/august/8.27.b.html.

Ian Fried, "New FireWire to blaze faster trail", downloaded Oct. 16, 2001, CNET News.com, http://news.cnet.com/news/0-1006-200-6021210.html.

Michael D. Johas Teener, "Understanding FireWire: The IEEE 1394 Standards and Specifications", downloaded Oct. 16, 2001, wysiwyg://9/http://www.chipcenter.com/networking/ieee1394/main.html.

Networking Tech Note, "1394 Standards and Specifications," 3 pgs, 2001.

International Search Report and Written Opinion for corresponding PCT Application No. PCT/US2005/045040 mailed May 15, 2006.

Menezes et al., "Handbook of Applied Cryptography," Identification and Entity Authentication, pp. 385-424, 1997.

Anonymous, "Future of Digital Music in Windows," Microsoft Windows Hardware Developer Central Archive, [Online] Dec. 4, 2001 URL:http:—www.microsoft.com-whdc-archive-digitaudio.mspx> [retrieved on Jan. 15, 2008], 3 pages.

Anonymous, "Introduction to Digital Audio," Microsoft Windows Hardware Developer Central Archive, [Online] Dec. 4, 2001 URL:http:—www.microsoft.com-whdc-archive-digitaudio.mspx> [retrieved on Jan. 15, 2008], 2 pages.

Anonymous, "Windows and Red Book Audio," Microsoft Windows Hardware Developer Central Archive, [Online] Dec. 4, 2001 URL:http:—www.microsoft.com-whdc-archive-Dmfuture.mspx> [retrieved Jan. 15, 2008], 2 pages.

Bindra, "Standard Turns Monitor into I-O HuB," Electronic Engineering Times, vol. 918, Sep. 6, 1996, p. 14.

Crawford et al., "Sample rate conversion and bit rate reduction in the studio," IEE Colloquim on Digital Audio Signal Processing, May 22, 1991, pp. 8-1-8-3.

Derman, "Monitors Make Net Connections," Electronic Engineering Times, vol. 933, 1996, pp. 60 and 69.

Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, ISSN: 1549-4950 figures 9, 10.

Lewis, "On Technology" Fortune Magazine, Dec. 9, 2002, p. 240.

"MPV™ Music Profile Specification Revision 1.00" Internet Citation [online] (Jan. 7, 2004) URL:http—www.osta.org-mpv-public-specs-MPVMusic-Prof-Spec-1.00.pdf> [retrieved Jun. 20, 2006] the whole document, 70 pages.

"Neuros MP3 Digital Audio Computer," www.neurosaudio.com, downloaded Apr. 9, 2003, 6 pages.

Severance, "FireWire Finally Comes Home," Michigan State University, Standards, Nov. 1998, pp. 117-118.

Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212.

"The Authoritative Dictionary of IEEE Standards Terms, Seventh Edition," Published by Standards Information Network, IEEE Press, 2000, 3 pages.

"Universal Serial Bus Specification—Rev 2.0," Chapter 9, USB Device Framework, no date, pp. 239-274.

German Patent Application No. 202005021674.7, German Search Report, 4 pages, Jan. 7, 2010.

\* cited by examiner

ACCESSORY AUTHENTICATION FOR ELECTRONIC DEVICES

CROSS-REFERENCE TO RELATED APPLICATIONS

The application claims the benefit of U.S. Provisional Patent Application No. 60/642,340, filed Jan. 7, 2005, entitled "ACCESSORY AUTHENTICATION FOR ELECTRONIC DEVICES," which is hereby incorporated herein by reference;

This application is also related to: (i) U.S. patent application Ser. No.: 11/051,441, filed Feb. 3, 2005, entitled "SMALL MEMORY FOOTPRINT FAST ELLIPTIC ENCRYPTION," which is hereby incorporated herein by reference; (ii) U.S. Provisional Patent Application No.: 60/642,276, filed Jan. 7, 2005, entitled "PORTABLE MEDIA DEVICE AND IMPROVED PLAYLIST PROCESSING ON MEDIA DEVICES," which is hereby incorporated herein by reference; (iii) U.S. Provisional Patent Application No.: 60/642,334, filed Jan. 7, 2005, entitled "MEDIA MANAGEMENT FOR GROUPS OF MEDIA ITEMS," which is hereby incorporated herein by reference; (iv) U.S. patent application Ser. No.: 11/031,547, filed Jan. 7, 2005, entitled "PORTABLE POWER SOURCE TO PROVIDE POWER TO AN ELECTRONIC DEVICE VIA AN INTERFACE," which is hereby incorporated herein by reference; (v) U.S. patent application Ser. No.: 11/031,288, filed Jan. 7, 2005, entitled "METHOD AND SYSTEM FOR DISCOVERING A POWER SOURCE ON A PERIPHERAL BUS," which is hereby incorporated herein by reference; (vi) U.S. patent application Ser. No.: 11/031,301, filed Jan. 7, 2005, entitled "CONNECTOR SYSTEM," which is hereby incorporated herein by reference; (vii) U.S. patent application Ser. No.: 10/833,689 , filed Apr. 27, 2004 , entitled "CONNECTOR INTERFACE SYSTEM FOR MULTI-COMMUNICATION DEVICE," which is hereby incorporated herein by reference.

BACKGROUND OF THE INVENTION

1. Field of the Invention

The present invention relates to electrical devices and, more particularly, to electrical devices, such as media players, that receive accessory devices.

2. Description of the Related Art

A media player stores media assets, such as audio tracks or photos, that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 4.2, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Currently, the connectors or ports of a media player are open for use so long as a compatible connector or port is utilized. Consequently, numerous third-parties have developed accessory devices for use with other manufacturers' media players. One difficulty is that the manufacturer of a media player has no control over the various different accessory devices that can be connected to the media player. This is problematic because third-party accessory devices may be inferior, error-prone, disruptive (e.g., resource draining), or even damaging to the media player itself. Another problem is that third-party accessory devices which are unauthorized by the manufacturer of the media device may attempt to utilize features of the media device in an inappropriate or undesired manner.

Thus, there is a need for improved techniques to enable manufacturers of electronic devices to control the nature and extent to which accessory devices can be utilized with their electronic devices.

SUMMARY OF THE INVENTION

Broadly speaking, the invention pertains to improved techniques to control utilization of accessory devices with electronic devices. The improved techniques can use cryptographic approaches to authenticate electronic devices, namely, electronic devices that interconnect and communicate with one another.

One aspect of the invention pertains to techniques for authenticating an electronic device, such as an accessory device. Another aspect of the invention pertains to provisioning software features (e.g., functions) by or for an electronic device (e.g., a host device). Different electronic devices can, for example, be provisioned differently depending on different degrees or levels of authentication, or depending on manufacturer or product basis. Still another aspect of the invention pertains to using an accessory (or adapter) to convert a peripheral device (e.g., USB device) into a host device (e.g., USB host). Embodiments of the invention may pertain to one or more of these aspects or other aspects disclosed herein.

The invention can be implemented in numerous ways, including as a method, system, device, apparatus (including graphical user interface), or computer readable medium. Several embodiments of the invention are discussed below.

As a portable electronic device, one embodiment of the invention includes at least: a media storage device that stores media content for one or more media items; a media presentation module that retrieves media content for at least one of the media items from the media storage and causes the media content to be presented for a user of the portable electronic device; an authentication table that stores authentication information for various accessory devices that are authorized to couple to and interact with the portable electronic device; and an authentication module that determines whether a particular accessory device that is coupled to the portable media device is authorized to interoperate with the portable electronic device based on at least a portion of the authentication information stored in the authentication table.

As an accessory device for a portable electronic device, one embodiment of the invention includes at least: an input/output port for interacting with the portable electronic device; an authentication algorithm; an authentication key associated with the accessory device; an authentication controller, operatively connected to the input/output port, for performing authentication operations using at least the authentication algorithm and the authentication key; and accessory circuitry that performs operations associated with the accessory device.

As a connector for connecting an accessory device to a media player, one embodiment of the invention includes at least: a connector body; a plurality of electrical contacts attached within the connector body and serving to provide electrical connections between the accessory device and the media player; and a controller disposed in the connector body and providing an authentication key that allows the accessory device to be authenticated by the media player.

As a method for authorizing an accessory device for use with an electronic device, one embodiment of the invention includes at least the acts of: receiving a device identifier from the accessory device; receiving an authentication value from the accessory device; determining whether the accessory device is authentic based on the authentication value; and authorizing usage of the accessory device with the electronic device when it is determined that the accessory device is authentic.

As a method for authorizing an accessory device for use with an electronic device, another embodiment of the invention includes at least the acts of: detecting attachment of the accessory device with the electronic device; sending a random number to the accessory device after attachment of the accessory device has been detected; subsequently receiving an encoded value from the accessory device; receiving a device identifier from the accessory device; obtaining a cryptographic key based on the device identifier; decoding the encoded value using the cryptographic key to produce a decoded value; determining whether the decoded value corresponds to the random number; and authorizing usage of the accessory device with the electronic device when it is determined that the decoded value corresponds to the random number.

As a method for authorizing an accessory device for use with an electronic device, still another embodiment of the invention includes at least the acts of: detecting attachment of the accessory device with the electronic device; sending an authentication request, including at least a random number, to the accessory device after attachment of the accessory device has been detected; subsequently receiving an authentication response from the accessory device, the authentication response being in response to the authentication request, and the authentication response including at least an encoded value and a device identifier for the accessory device; obtaining a cryptographic key based on the device identifier; decoding the encoded value using the cryptographic key to produce a decoded value; and authorizing usage of the accessory device with the electronic device based on a correspondence between the decoded value and the random number.

As a method for authorizing an accessory device for use with an electronic device, still yet another embodiment of the invention includes at least the acts of: receiving a random number from the electronic device; encoding the random number using a cryptographic key provided within the accessory device, thereby producing an encoded value; and sending the encoded value and a device identifier to the electronic device.

As a method for controlling interaction between a media player and an accessory device, one embodiment of the invention includes at least the acts of: determining a classification of the accessory device; identifying an authorization level for the accessory device; and selectively activating features of the media device that are available to be used in conjunction with the accessory device based on the classification and authorization level of the accessory device.

As a media player system, one embodiment of the invention includes at least: a media player storing media content and supporting a plurality of predetermined functions, and an accessory device capable of connecting to the media player. The media player and the accessory device interact to perform an authentication process and, based on the authentication process, specific functions of the media device are selectively activated and thus available for use by the accessory device.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF THE INVENTION

The invention pertains to improved techniques to control utilization of accessory devices with electronic devices. The improved techniques can use cryptographic approaches to authenticate electronic devices, namely, electronic devices that interconnect and communicate with one another.

The improved techniques are particularly well suited for electronic devices, such as media devices, that can receive accessory devices. One example of a media device is a media player, such as a hand-held media player (e.g., music player), that can present (e.g., play) media items (or media assets). Examples of accessories for media devices, include: voice recorder, FM transceivers, peripheral bus devices (e.g., FireWire® devices or USB devices), media devices (e.g., media readers, displays, cameras, etc.), power units (e.g., power adapters, battery packs, etc.), speakers (headphones or speaker systems), remote control devices, network devices, or automobile integration units).

One aspect of the invention pertains to techniques for authenticating an electronic device, such as an accessory device. Another aspect of the invention pertains to provisioning software features (e.g., functions) by or for an electronic device (e.g., a host device). Different electronic devices can, for example, be provisioned differently depending on different degrees or levels of authentication, or depending on manufacturer or product basis. Still another aspect of the invention pertains to using an accessory (or adapter) to convert a peripheral device (e.g., USB device) into a host device (e.g., USB host). Embodiments of the invention may pertain to one or more of these aspects or other aspects disclosed herein.

Embodiments of the invention are discussed below with reference to FIGS. 1-12. However, those skilled in the art will readily appreciate that the detailed description given herein with respect to these figures is for explanatory purposes as the invention extends beyond these limited embodiments.

Figure 1A:
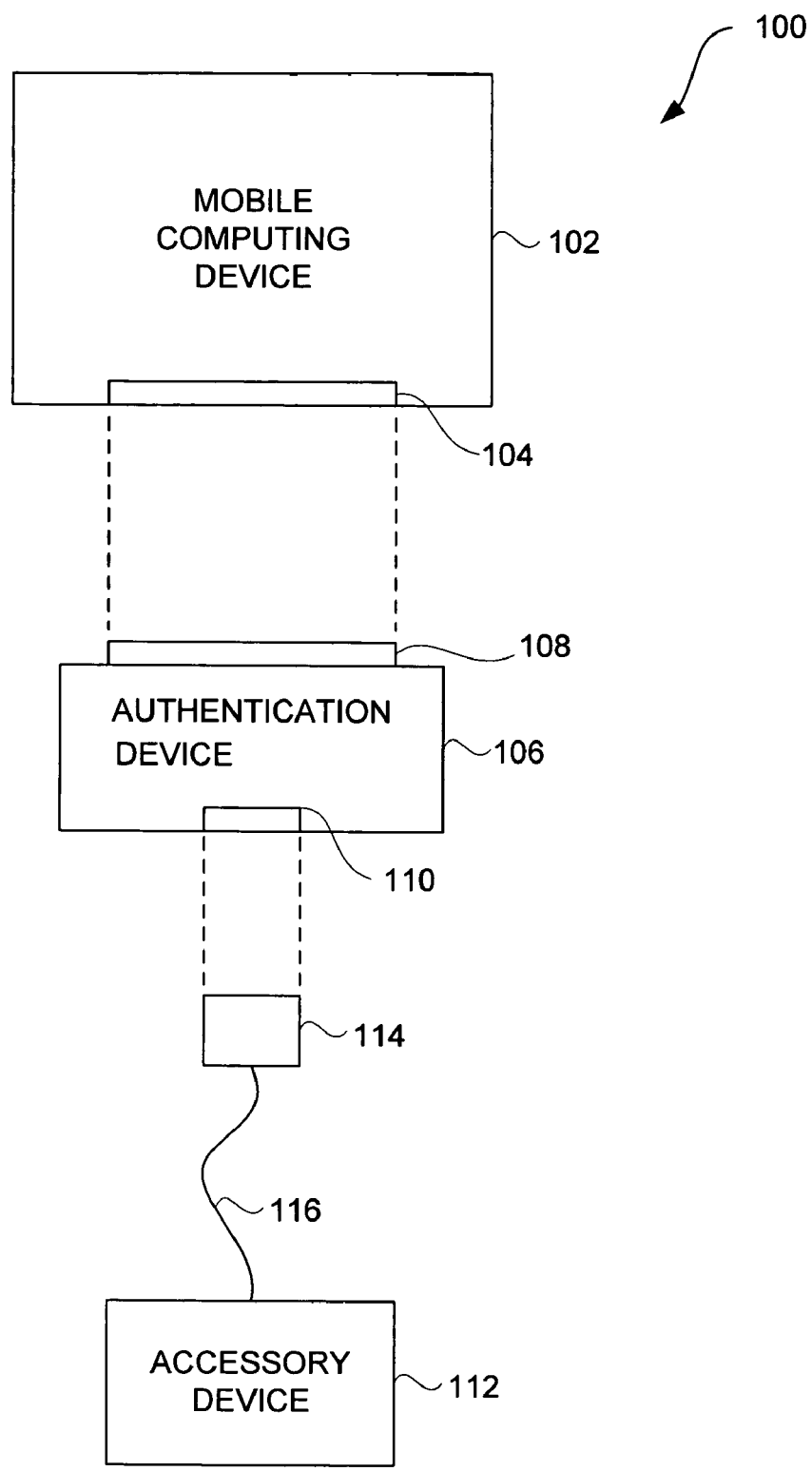
FIG. 1A is a block diagram of an accessory authentication system according to one embodiment of the invention.

FIG. 1A is a block diagram of an accessory authentication system 100 according to one embodiment of the invention. The accessory authentication system 100 includes a mobile computing device 102. The mobile computing device 102 can also be referred to as a host device. Additionally, the mobile computing device 102 can, for example, pertain to a media player, a personal digital assistant, or a mobile telephone. The mobile computing device 102 includes a connector port 104 for receiving a connector.

The accessory authentication system 100 also includes an authentication device 106 having a connector 108 and a connector port 110. The authentication device 106 can be attached to the mobile computing device 102. In particular, when the authentication device 106 is attached to the mobile computing device 102, the connector 108 of the authentication device 106 is received by the connector port 104 of the mobile computing device 102. When the connector 108 is coupled into the connector port 104, the authentication device 106 is physically and electrically connected to the mobile computing device 102.

The accessory authentication system 100 further includes an accessory device 112. The accessory device 112 provides certain functionality to the mobile computing device 102 when the accessory device 112 is interconnected with the mobile computing device 102 via the authentication device 106. To facilitate such interconnection, the accessory device 112 includes a connector 114 and a cable 116. The cable 116 connects the connector 114 to the accessory device 112. The connector 114 can be coupled to the connector port 110 of the authentication device 106. When such connection has been made, the accessory device 112 is in electrical communication with the mobile computing device 102 via the authentication device 106.

Although the accessory authentication system 100 includes the connector 114 and the end of the cable 116, the connector 114 can be integrated into the accessory device 112. In other words, in another embodiment, the cable 116 is not needed.

According to one aspect of the invention, the authentication device 106 serves to authenticate itself to the mobile computing device 102. An authenticated device is deemed authorized to interact with the mobile computing device 102. Also, once authorized, the nature and degree of interaction between the authenticated device 106 (or the accessory device 102) and the mobile computing device 102 can be controlled. Consequently, once authorized, the mobile computing device 102 can consider the authentication device 106 to be a trusted partner which is permitted to access functions, features or operations of the mobile computing device 102. On the other hand, if the mobile computing device 102 determines that the authentication device 106 is not associated with a trusted partner, then the mobile computing device 102 can prevent or limit interactions with either the authentication device 106 for the accessory device 112. The authentication device 106 itself can also be considered an accessory device for the mobile computing device 102.

In one embodiment, the authentication device 106 serves as a bus interface adapter, such as a USB or FireWire® adapter. In such an embodiment, the authentication device 106 servers to adapt the mobile computing device 102 to a bus host device (e.g., USB or FireWire® host). The accessory device 112 then advantageously need only operate as a bus peripheral device (e.g., USB or FireWire® device).

Figure 1B:
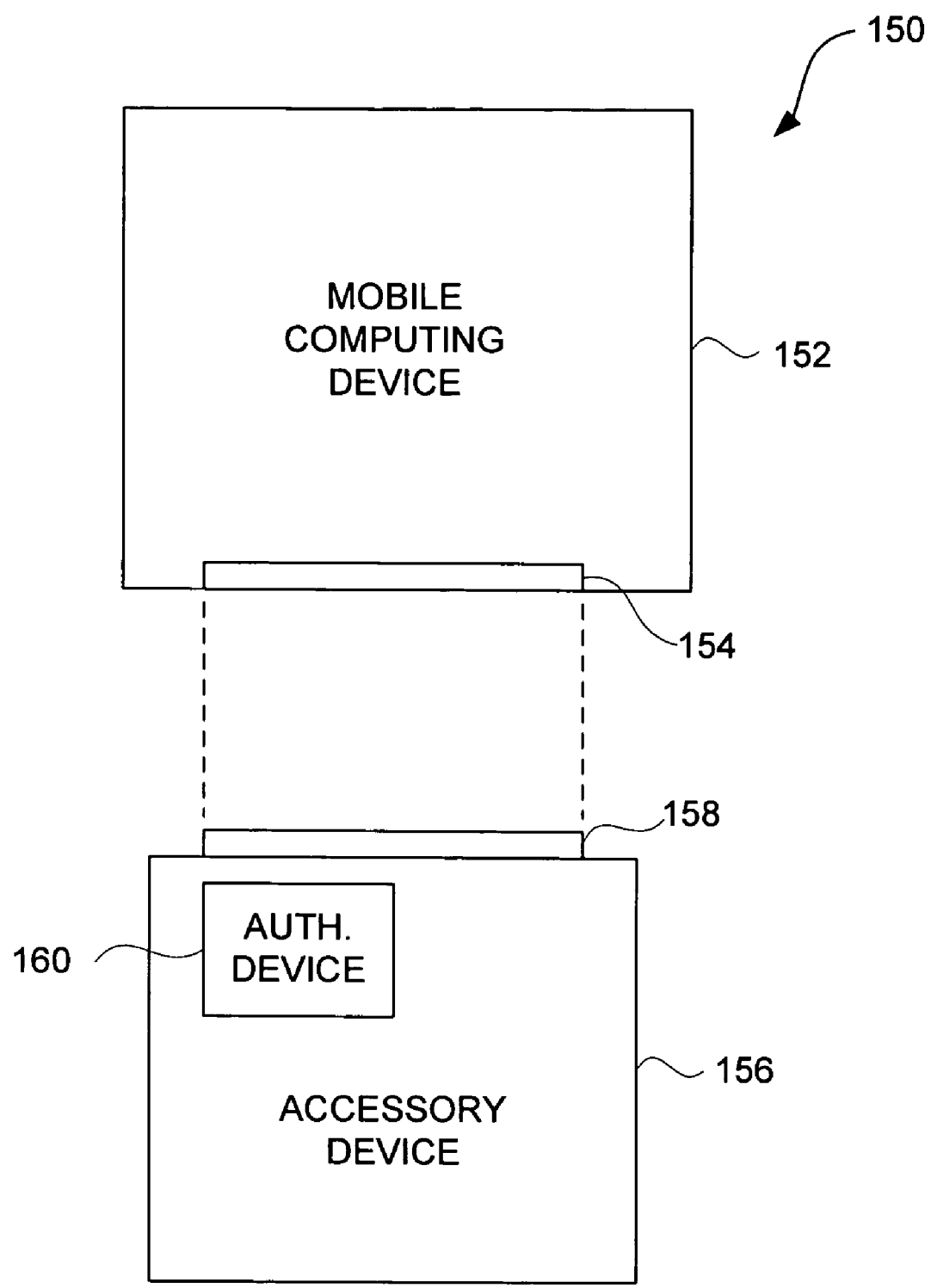
FIG. 1B is a block diagram of an accessory authentication system according to another embodiment of the invention.

FIG. 1B is a block diagram of an accessory authentication system 150 according to another embodiment of the invention. The accessory authentication system 150 includes a mobile computing device 152 having a connector port 154. The mobile computing device 152 can also be referred to as a host device. Additionally, the mobile computing device 152 can, for example, pertain to a media player, a personal digital assistant, or a mobile telephone.

The accessory authentication system 150 also includes an accessory device 156. The accessory device 156 includes a connector 158 and an authentication device 160. In this embodiment, the authentication device 160 in internal to the accessory device 156. The accessory device 156 can be coupled to the mobile computing device 152 by inserting the connector 158 into the connector port 154. One such connection is established, the accessory device 156 is electrically connected to the mobile computing device 152. Nevertheless, the mobile computing device 152 can interact with the authentication device 160 to enable the mobile computing device 152 to authenticate the accessory device 156. When authenticated, the accessory device 156 is deemed authorized to interact with the mobile computing device 152. Once authorized, the nature and degree of interaction between the accessory device 156 and the mobile computing device 152 can be controlled. Consequently, once authorized, the mobile computing device 152 can consider the accessory 156 to be a trusted partner (or associated with a trusted partner) which is permitted to access functions, features or operations of the mobile computing device 152. On the other hand, if the mobile computing device 152 determines that the accessory device 156 is not a trusted partner (or not associated with a trusted partner), then the mobile computing device 152 can prevent or limit interactions with the accessory device 156.

Figure 1C:
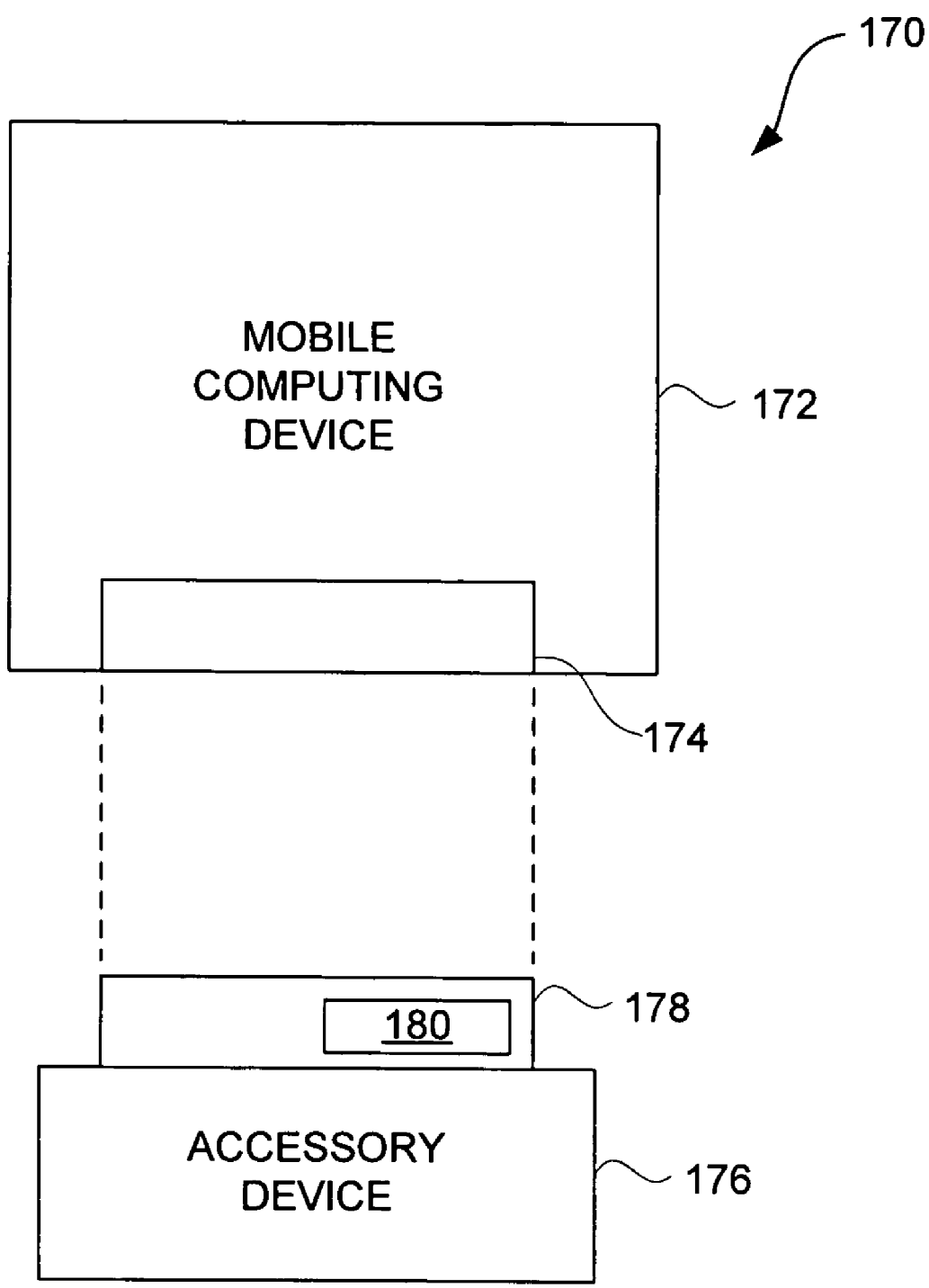
FIG. 1C is a block diagram of an accessory authentication system according to still another embodiment of the invention.

FIG. 1C is a block diagram of an accessory authentication system 170 according to still another embodiment of the invention. The accessory authentication system 170 includes a mobile computing device 172 having a connector port 174. The mobile computing device 172 can also be referred to as a host device. The mobile computing device 172 can, for example, pertain to a media player, a personal digital assistant, or a mobile telephone. The accessory authentication system 170 also includes an accessory device 176. The accessory device 176 includes a connector 178 and an authentication device 180. In this embodiment, the authentication device 180 in coupled to or integrated with the connector 178. The authentication device can be relatively small and thus by coupled to or integrated with the connector 178. By providing the authentication device 180 in the connector 178, an accessory device can easily be manufactured to provide authentication capabilities.

The accessory device 176 can be coupled to the mobile computing device 172 by inserting the connector 178 into the connector port 174. One such connection is established, the accessory device 176 is electrically connected to the mobile computing device 172. Nevertheless, the mobile computing device 172 can interact with the authentication device 180 to enable the mobile computing device 172 to authenticate the accessory device 176. When authenticated, the accessory device 176 is deemed authorized to interact with the mobile computing device 172. Once authorized, the nature and degree of interaction between the accessory device 176 and the mobile computing device 172 can be controlled. Consequently, once authorized, the mobile computing device 172 can consider the accessory 176 to be a trusted partner (or associated with a trusted partner) which is permitted to access functions, features or operations of the mobile computing device 172. On the other hand, if the mobile computing device 172 determines that the accessory device 176 is not a trusted partner (or not associated with a trusted partner), then the mobile computing device 172 can prevent or limit interactions with either the accessory device 172.

Additionally, although FIGS. 1A-1C reference authentication devices utilized to authenticate an accessory device for a mobile computing device, it should be understood that such authentication devices can alternatively be used to authenticate a mobile computing device for an accessory device. In any case, the authentication being performed is done in a secure manner, such as using cryptographic techniques. The cryptographic techniques not only serve to substantially prevent counterfeit accessory devices from being utilized, but also cause reduction in opportunities for "spoofing." In one embodiment, the cryptographic techniques use a public-private key set to form a valid digital signature.

Figure 2A:
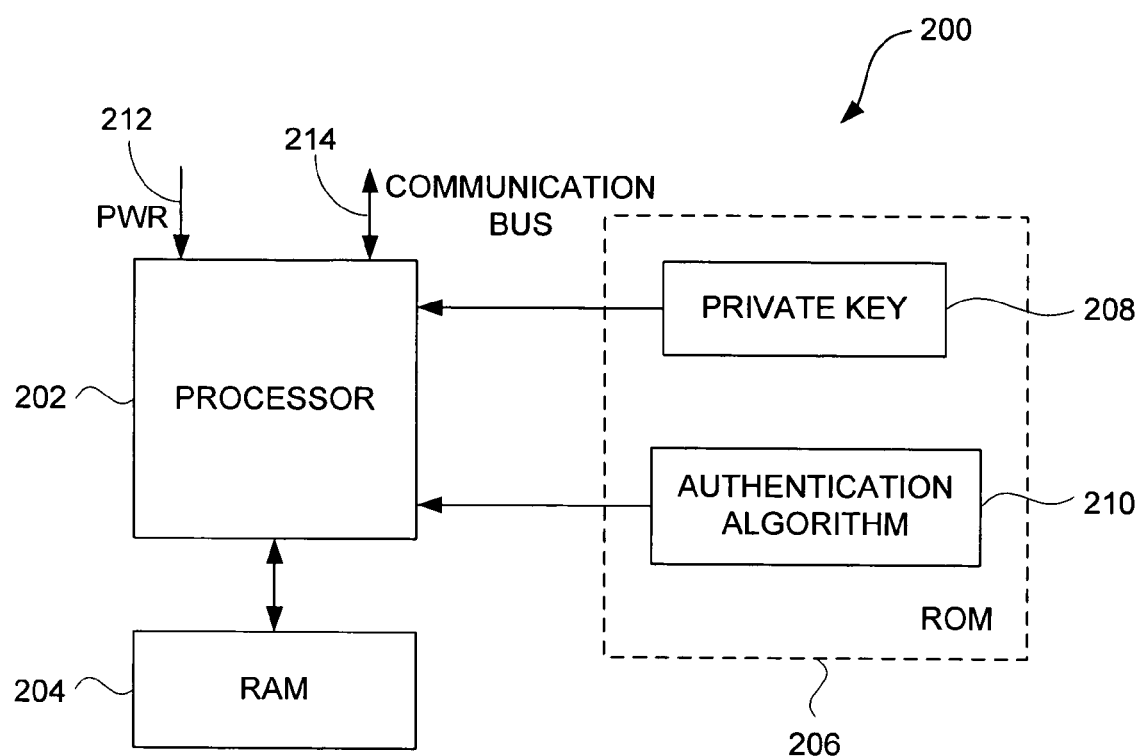
FIG. 2A is a block diagram of an authentication controller according to one embodiment of the invention.

FIG. 2A is a block diagram of an authentication controller 200 according to one embodiment of the invention. The authentication controller 200 includes a processor 202, a Random Access Memory (RAM) 204, and a Read-Only Memory (ROM) 206. The ROM 206 includes a private key 208 and an authentication algorithm 210. The authentication controller 200 also receives a power line 212 and a communication bus (link) 214. For example, the power line 212 and the communication bus 214 can be provided by a connector of the authentication controller 200, such as the connector 108 illustrated in FIG. 1A, the connector 158 illustrated in FIG. 1B, or the connector 178 illustrated in FIG. 1C.

The processor 202 typically interacts with a mobile computing device (via the communication bus 214) to authenticate an accessory device (or an authentication device). During an authentication process, the processor 202 makes use of the authentication algorithm 210 as well as the private key 208 stored within the authentication controller 200. The authentication algorithm 210 can vary with different implementations, and suitable authentication algorithms are known to those skilled in the art.

Although not shown in FIG. 2A, the authentication controller 200, or an authentication device or accessory device including or utilizing the authentication controller 200, can further include a device identifier and additional circuitry. The device identifier can, for example, pertain to a product identifier and/or a manufacturer identifier. The additional circuitry can vary with implementation. When the additional circuitry is within an accessory device, the additional circuitry can be referred to as accessory circuitry.

In one embodiment, the authentication controller 200 is implemented on a single integrated circuit (i.e., single chip). By providing the authentication controller 200 on a single integrated circuit, external access to the private key 208 and the authentication algorithm 210 is substantially-prevented. As a result, the authentication process is not only cryptographically secured but also physically secured by limited physical access.

Figure 2B:
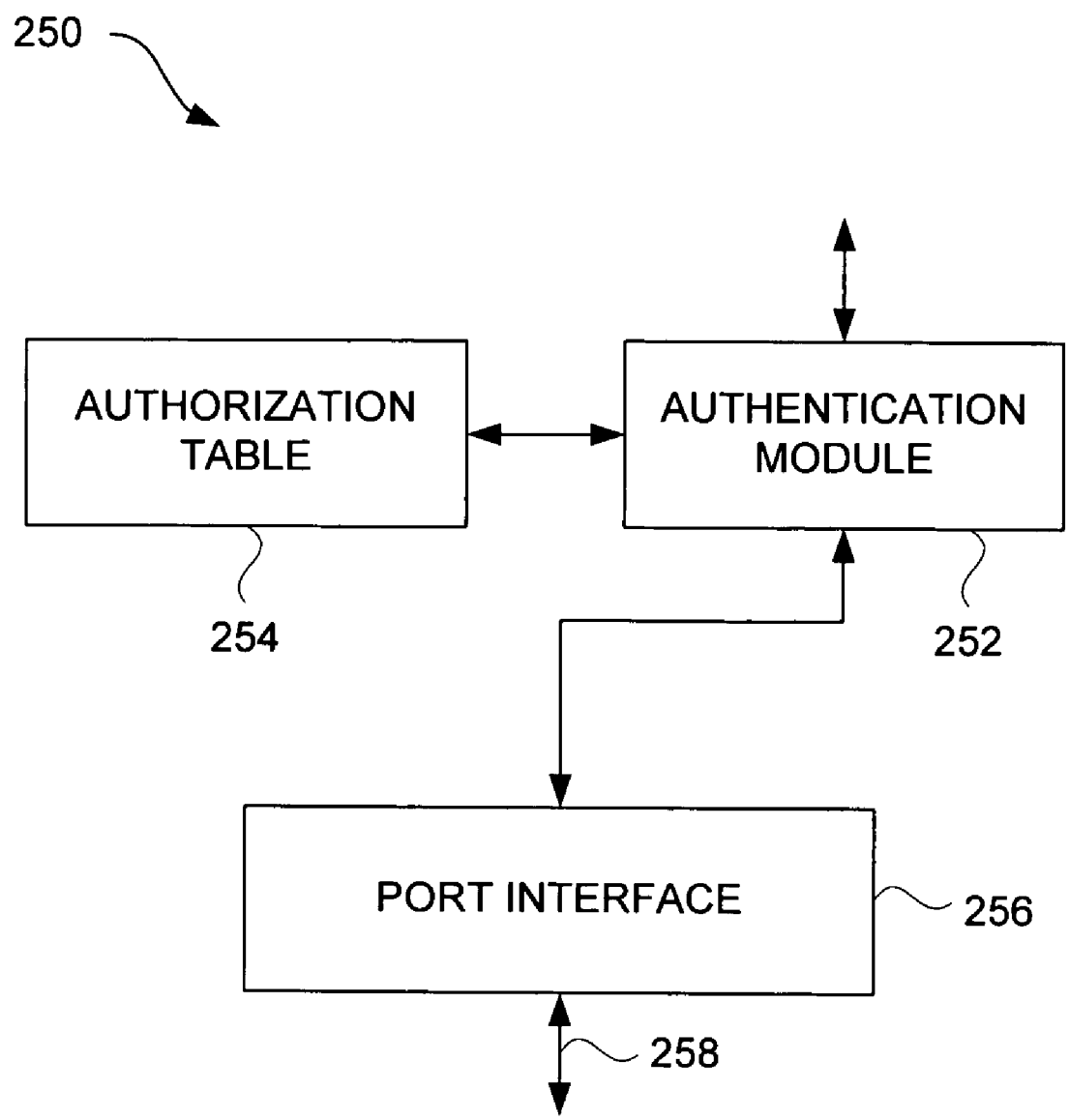
FIG. 2B is a block diagram of an authentication manager according to one embodiment of the invention.

FIG. 2B is a block diagram of an authentication manager 250 according to one embodiment of the invention. The authentication manager 250 is, for example, provided within an electronic device, such as the mobile computing device 102 illustrated in FIG. 1A, the mobile computing device 152 illustrated in FIG. 1B, or the mobile computing device 172 illustrated in FIG. 1C. In this embodiment, the authentication manager 250 of the electronic device authenticates an accessory device (or authentication device).

The authentication manager 250 includes an authentication module 252, an authorization table 254, and a port interface 256. The authentication module 252 operates to evaluate whether a particular accessory device (or authentication device) that couples to the port interface 256 is authentic and thus permitted to interoperate with the electronic device. The port interface 256 can provide power and a communication bus 258 to the accessory device (or authentication device). The authorization table 254 stores authentication information that is utilized by the authentication module 252 to evaluate whether certain accessory devices (or authentication devices) are authentic. As previously noted, the authentication manager 250 is provided within the electronic device, which can be referred to as a host device.

The electronic device (or host device) typically has various operating features that can be invoked or utilized. In one embodiment, an accessory device that is authenticated by the authentication manager 250 can have complete access to all of the features available on the electronic device (or host device). In another embodiment, the authorization table 254 can control the manner in which the features of the electronic device or host device that are made available to the accessory device. As an example, if the electronic device (or host device) offers a plurality of different features that can be utilized, the authorization table 254 can contain an indication as to which of these available features are permitted to be utilized by a particular accessory device. For example, authorization can be classified into levels or classes, each of which having different authorizations. The authorization can also specify the manner by which the different features are authorized for use. Hence, features may be authorized for use in limited ways. For example, a feature may be authorized for use over a slow communication interface (e.g., serial) with the electronic device and not over a fast communication interface (FireWire® or USB) with the electronic device. In other words, in this example, features may be authorized for use over only certain interface mechanisms.

Figure 3:
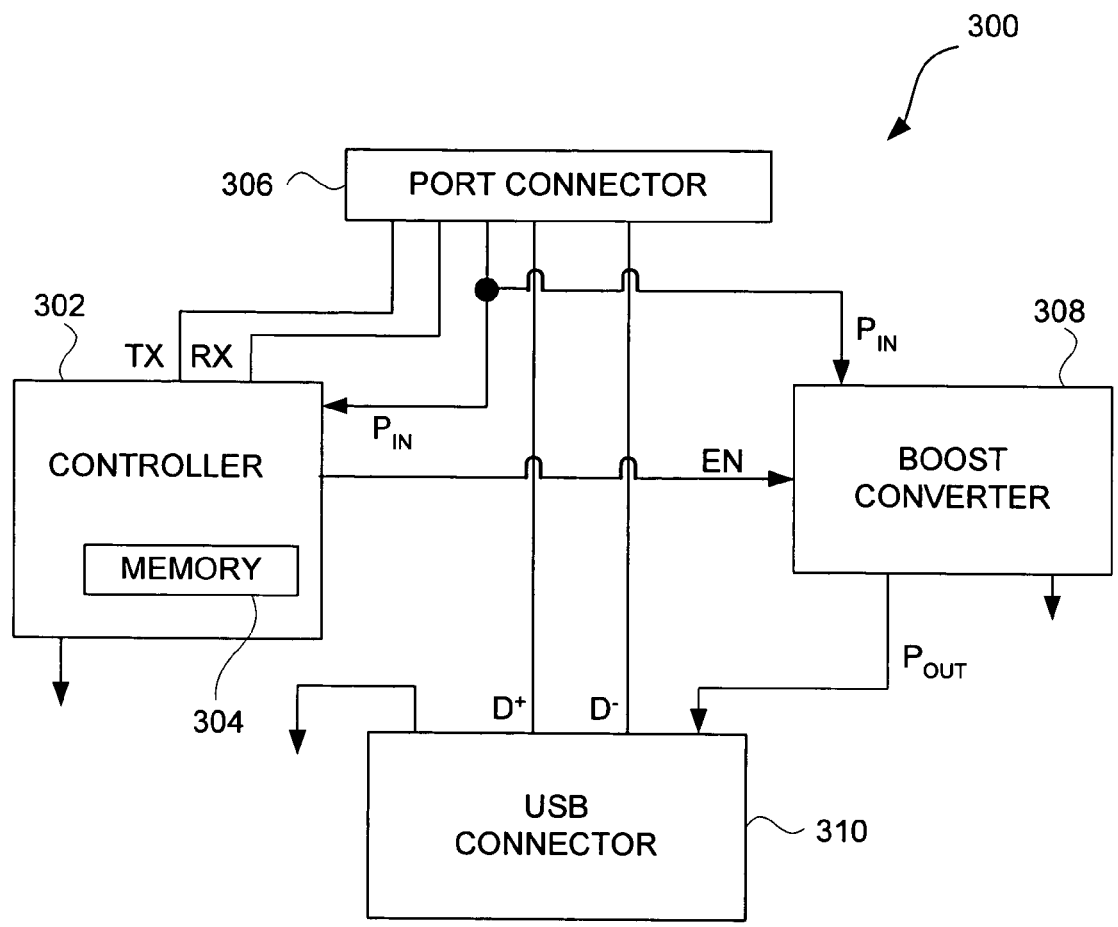
FIG. 3 is a block diagram of an authentication device according to one embodiment of the invention.

FIG. 3 is a block diagram of an authentication device 300 according to one embodiment of the invention. In this embodiment, the authentication device 300 not only contains circuitry for authentication of itself or an accessory device coupled thereto, but also additional circuitry for providing other functions by the authentication device 300. In particular, the authentication device 300 is designed to couple to an electronic device as well as to an accessory device. As shown in FIG. 3, the authentication device 300 includes a controller 302 that includes memory 304. As an example, the controller 302 can pertain to the authentication controller 200 illustrated in FIG. 2A. The controller 302 can couple to a port connector 306 which in turn can connect to the electronic device. The port connector 306 can provide power from the electronic device to the controller 302 and a boost converter 308 over a power line (PIN). Additionally, the controller 302 can communicate with the electronic device through the port connector 306 by way of transmit and receive communication lines (TX, RX). Through such communication, the electronic device can determine whether the authentication device 300 is authorized for use with the electronic device. If the electronic device determines that the authentication device 300 is authorized, then the controller 302 can enable a boost converter 208 using an enable signal (EN). Once enabled, the boost converter 308, which receives an input voltage on the power line ($P_{IN}$) from the port connector 306, can output a boosted output voltage on a power line ($P_{OUT}$) to a USB connector 310. For example, the input voltage can be 3.3 Volts and the boosted output voltage can be 5.0 Volts. The USB connector 310 also receives a pair of differential data lines (D+, D−) from the port connector 306 to allow data transmission between the electronic device and an accessory device that can be coupled to the USB connector 310.

In this embodiment, the authentication device 300 can operate to convert an electronic device into a host device, such as a USB host. Typically, the electronic device is a USB device, not a host device, but the attachment of the authentication device 300 to the electronic device can convert the electronic device into a host device. The host device can be USB compliant so that any USB device can be connected to the USB connector 310. In which case, any accessory with a USB port can connect with the electronic device via the authentication device 300.

The authentication techniques utilized by the invention can be utilized to allow a host device to authenticate an accessory device, or can allow an accessory device to authenticate a host device. The authentication process between the host device and the accessory device can be initiated at any time during coupling between the authentication device and the host device. For example, the authentication process can be initiated on connection of accessory device to host device, on first usage of restricted features, or periodically.

Figure 4A:
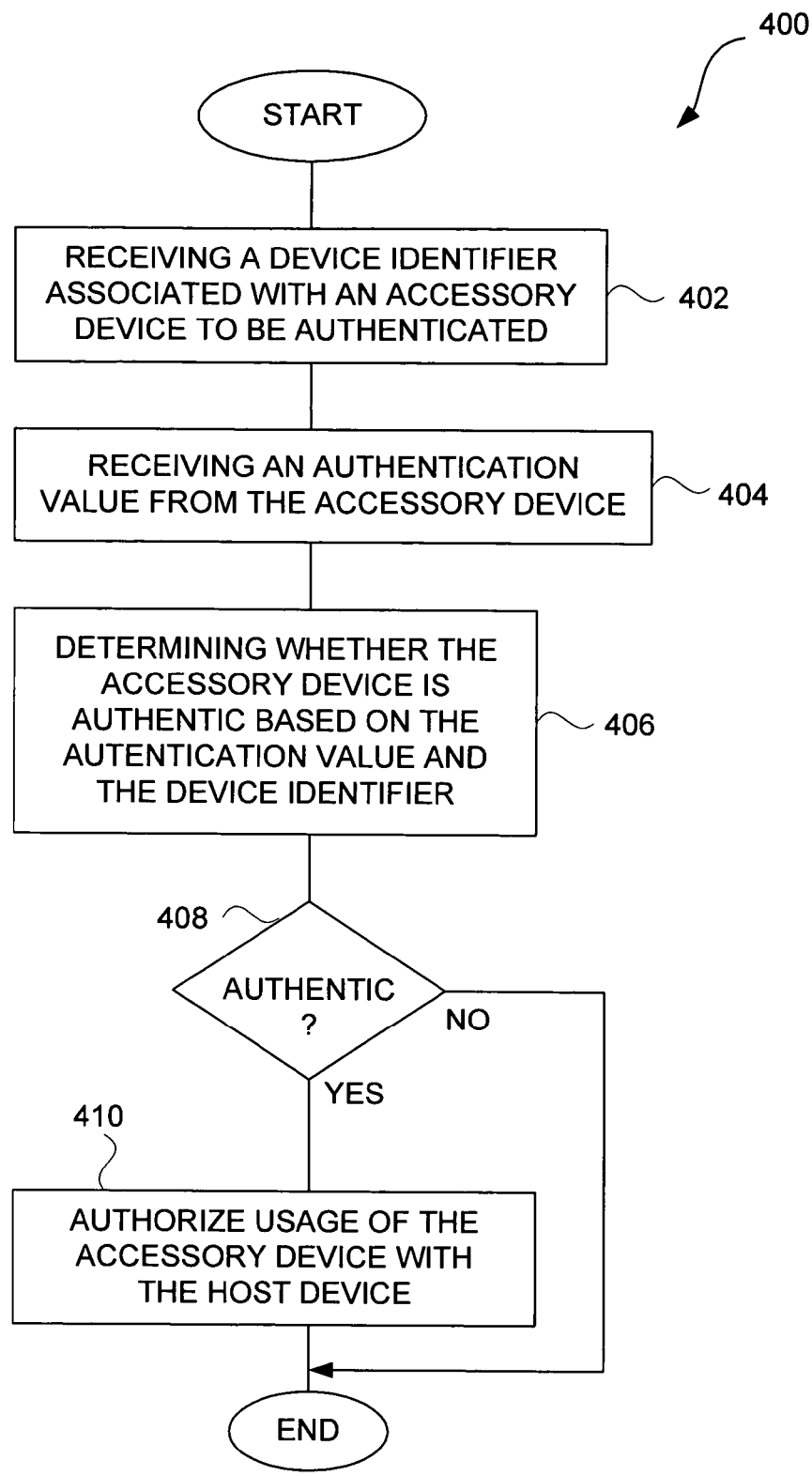
FIG. 4A is a flow diagram of a host authentication process according to one embodiment of the invention.

FIG. 4A is a flow diagram of a host authentication process 400 according to one embodiment of the invention. The host authentication process 400 is, for example, performed by a host device.

The host authentication process 400 initially receives 402 a device identifier associated with an accessory device to be authenticated. Additionally, an authentication value is received 404 from the accessory device. Here, the host device it is performing the authentication process; hence, the accessory device provides the authentication value to the host device. In one embodiment, in determining the authentication value, the accessory device utilizes a random number and a private key. The random number can be provided to the accessory device by the host device, or the random number can be available from the accessory device.

Next, the host authentication process 400 determines 406 whether the accessory device is authentic based on the authentication value and the device identifier. A decision 408 then determines whether the accessory device is authentic based on the determination made at block 406. When the decision 408 determines that the accessory device has been determined to be authentic, usage of the accessory device with the host device is authorized 410. The nature of the usage being authorized 410 can vary depending upon implementation. For example, the usage authorized 410 could allow complete usage of the accessory device or could allow limited usage of the accessory device.

On the other hand, when the decision 408 determines that the accessory device is not authentic, then the block 410 is bypassed such that the accessory device is not authorized for usage with the host device. In this case, since the accessory device was not determined to be authentic, usage of the accessory device with the host device is substantially restricted or prevented. Following the block 410, or its being bypassed, the host authentication process 400 is complete and ends.

Figure 4B:
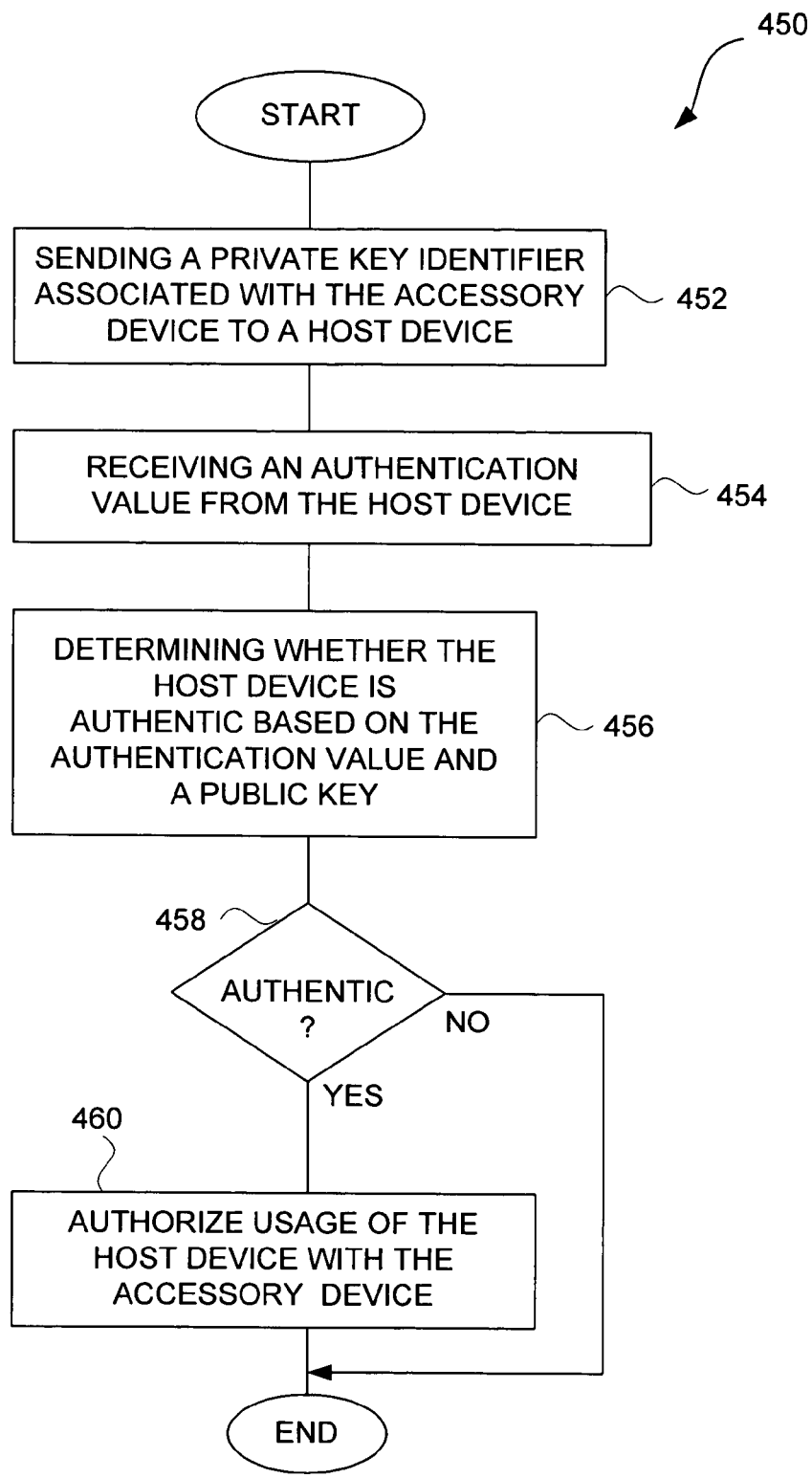
FIG. 4B is a flow diagram of an accessory authentication process according to one embodiment of the invention.

FIG. 4B is a flow diagram of an accessory authentication process 450 according to one embodiment of the invention. The accessory authentication process 450 is, for example, performed by an accessory device.

The accessory authentication process 450 sends 452 a private key identifier associated with the accessory device to a host device. The private key identifier is used by the host device to obtain an appropriate private key which is used by the host device in producing the authentication value which is sent to the accessory device. The accessory device will receive 454 an authentication value from the host device.

Next, the accessory authentication process 450 determines 456 whether the host device is authentic based on the authentication value and a public key. Typically, the public key would be provided internal to the accessory device. A decision 458 then determines whether the host device has been determined to be authentic. When the decision 458 determines that the host device has been deemed authentic, then usage of the host device with the accessory device is authorized 460. The nature of the usage being authorized 460 can vary depending upon implementation. For example, the usage authorized 460 could allow complete usage of the host device or could allow limited usage of the host device.

On the other hand, when the decision 458 determines that the host device is not authentic, then the block 460 is bypassed, such that usage of the host device with the accessory device is substantially restricted or prevented. Following the block 460, or its being bypassed, the accessory authentication process 450 is complete and ends.

Figure 5A:
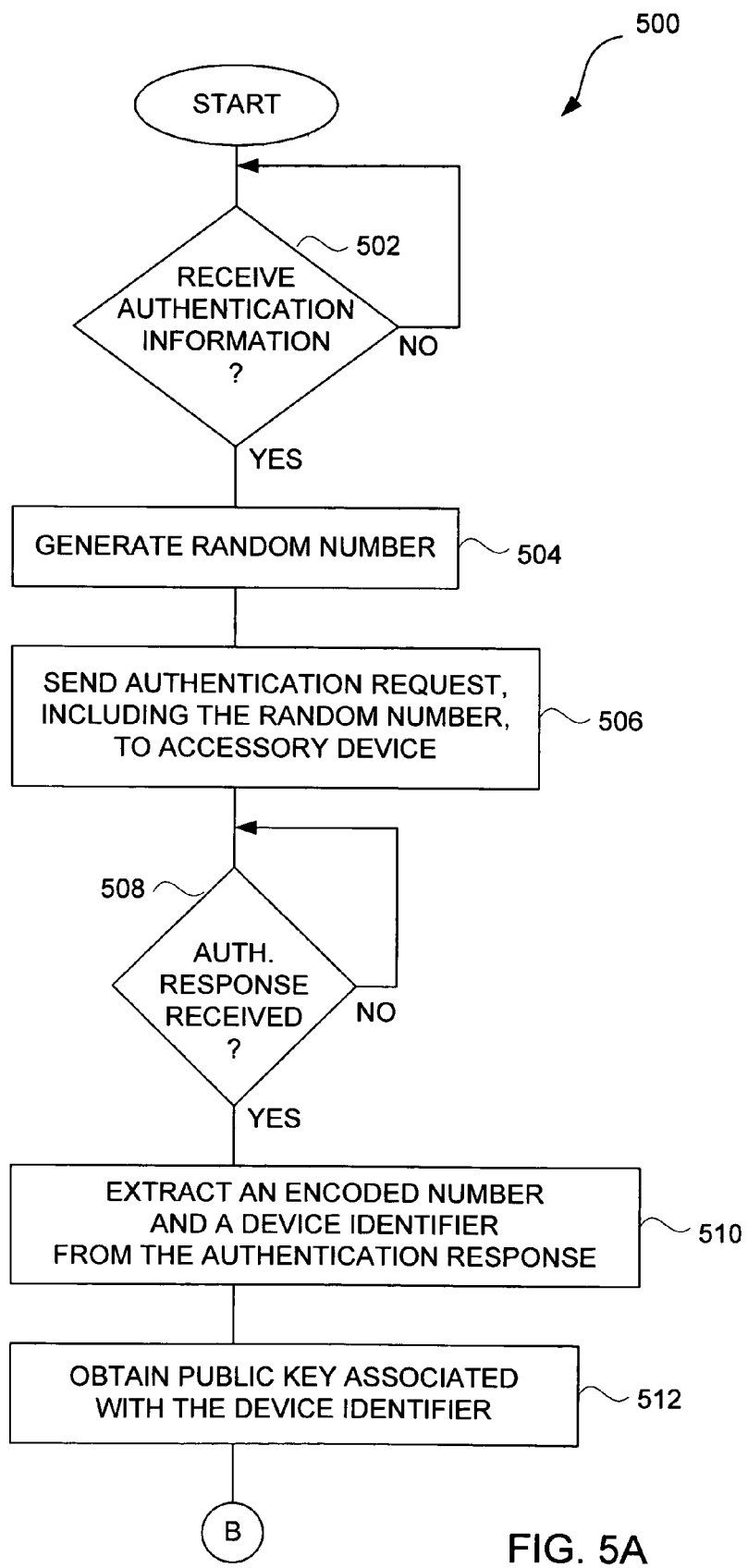
FIGS. 5A and 5B are flow diagrams of host device processing according to one embodiment of the invention.
Figure 5B:
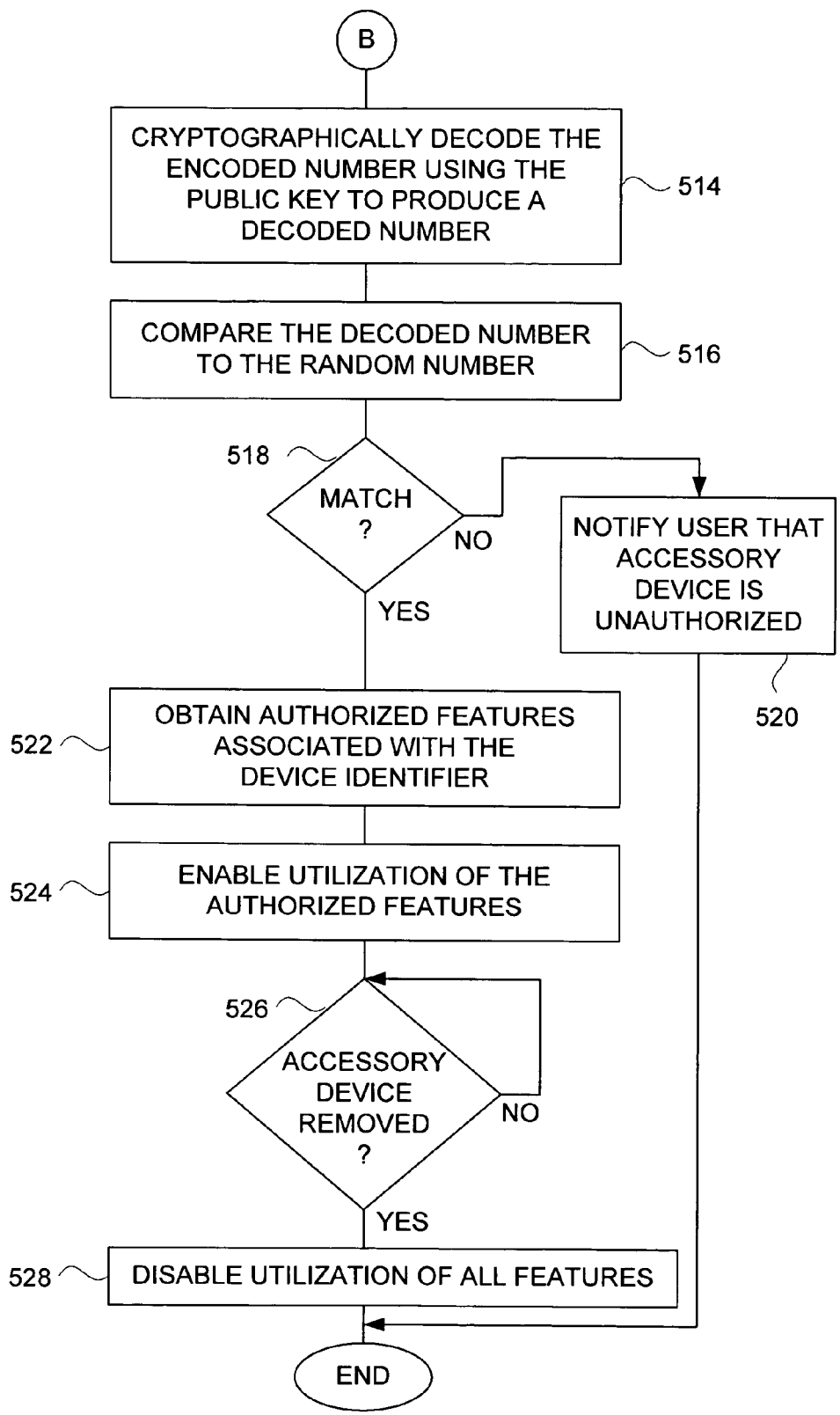

FIGS. 5A and 5B are flow diagrams of host device processing 500 according to one embodiment of the invention. The host device processing 500 is, for example, performed by an electronic device, such as the mobile computing device 152 illustrated in FIG. 1A, the mobile computing device 152 illustrated in FIG. 1B, or the mobile computing device 172.

The host device processing 500 begins with a decision 502 that determines whether authentication information has been received from an accessory device. When the decision 502 determines that authentication information has not been received, the host device processing 500 awaits receipt of authentication information. Once the decision 502 determines that authentication information has been received at the host device, the host device processing 500 continues. Namely, a random number is generated 504 at the host device. Typically, the random number is generated 504 at the host device in a random matter, such as using a random number generator. Next, an authentication request is sent 506 to the accessory device. Here, the authentication request includes at least a random number.

A decision 508 then determines whether an authentication response has been received from the accessory device. When the decision 508 determines that the authentication response has not yet been received, then the host device processing 500 awaits receipt of such an authentication response. Once the decision 508 determines that an authentication response has been received, an encoded number and a device identifier are extracted 510 from the authentication response.

Then, using the device identifier, a public key can be obtained 512. In one embodiment, the host device includes a plurality of public keys that are assigned to various different accessory devices. The device identifier, in such an embodiment, can be utilized to designate a particular accessory device and thus permit selection of an appropriate one of the public keys. Next, the encoded number is cryptographically decoded 514 using the public key to produce a decoded number. The decoded number is then compared 516 to the random number. In other words, the decoded number that is derived from the encoded number that was received in the authentication response from the accessory device is compared 516 with the random number that was previously sent to the accessory device in the authentication request. A decision 518 then determines whether the decoded number matches the random number. When the decision 518 determines that the decoded number does not match the random number, a user can optionally be notified 520 that the accessory device its unauthorized. Such a notification can be achieved by visual means or audio means. For example, a visual notification could be presented on a display device associated with the host device or the accessory device.

On the other hand, when the decision 518 determines that the decoded number does match the random number, authorized features associated with the device identifier are obtained 522. Then, utilization of the authorized features is enabled 524. Next, a decision 526 can determine whether the accessory device has been removed (or detached) from the host device. When the decision 526 that the accessory device has not been removed, then the host device processing 500 can continue to permit the utilization of the authorized features. However, once the decision 526 determines that the accessory device has been removed, the utilization of all features of the host device can be disabled 528. In other words, as an example, the authorized features can considered enabled for utilization during a session. The session can remain active so long as the accessory device remains attached to the host device. Once detached, the session ends and subsequent re-attachment requires re-authentication. Following the operation 528, as well as following the operation 520, the host device processing 500 is complete and ends.

Figure 6A:
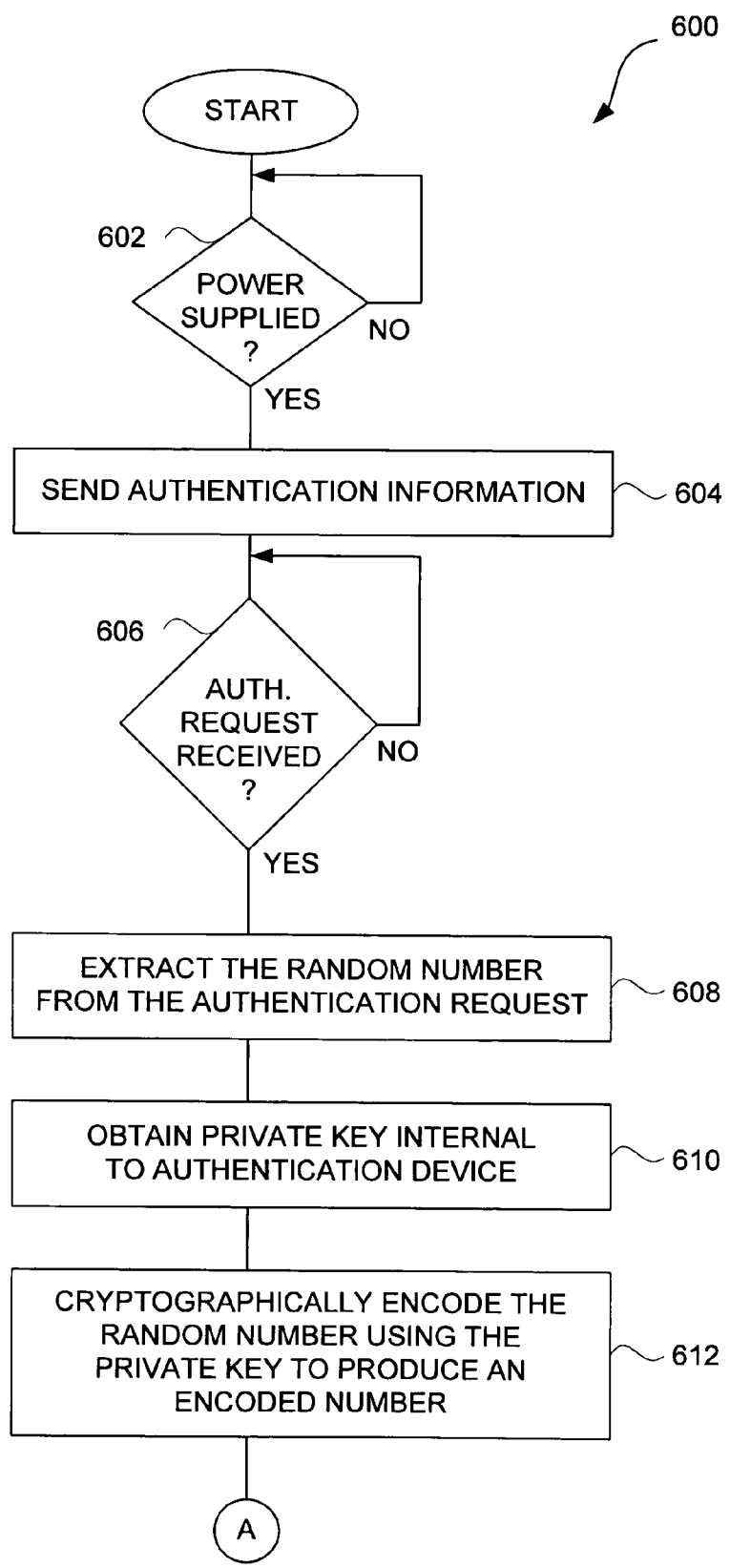
FIGS. 6A and 6B are flow diagrams of accessory device processing according to one embodiment of the invention.
Figure 6B:
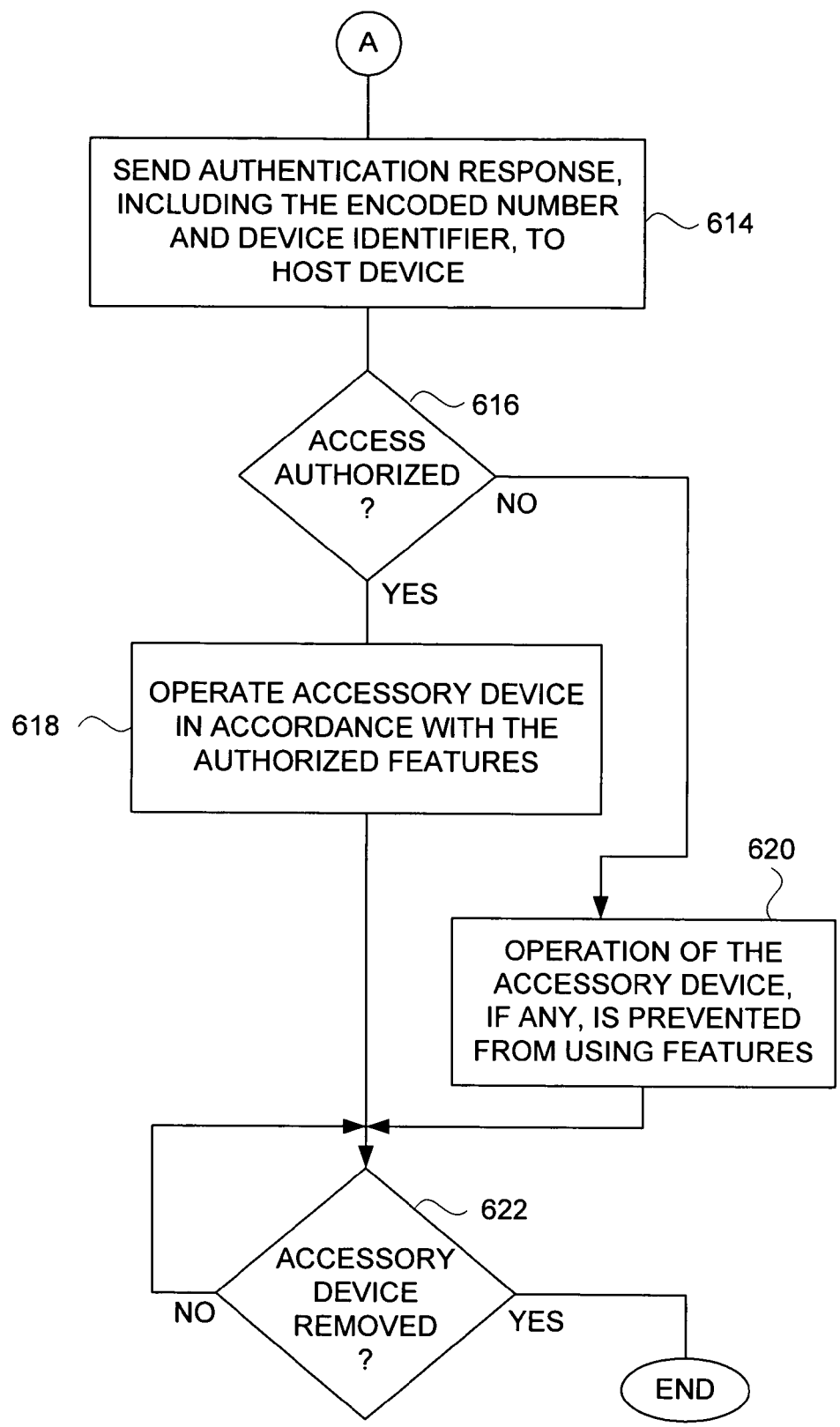

FIGS. 6A and 6B are flow diagrams of accessory device processing 600 according to one embodiment of the invention. The accessory device processing 600 is, for example, performed by an accessory device, such as the accessory device 112 shown in FIG. 1A, the accessory device 156 shown in FIG. 1B, or the accessory device 176 shown in FIG. 1C. The accessory device processing 600 represents counterpart processing to the host device processing 500 illustrated in FIGS. 5A and 5B.

The accessory device processing 600 begins with a decision 602 that determines whether power is supplied to the accessory device. When the decision 602 determines that power is not supplied to the accessory device, the accessory device processing 600 awaits available power. Typically, power is supplied to the accessory device once the accessory device is connected to a host device. Hence, the decision 602 can alternatively determine whether the accessory device is connected to a host device.

Once the decision 602 determines that power is supplied to the accessory device, authentication information can be sent 604 to the host device. In one embodiment, the authentication information can include information indicating the one or more authentication versions that are supported. A decision 606 then determines whether an authentication request has been received. When the decision 606 determines that an authentication request is not been received, then the accessory device processing 600 awaits such a request. Once the decision 606 determines that an authentication request has been received, the random number provided in the authentication request is extracted 608. A private key is obtained 610 from the authentication device. For security reasons, the private key can be stored internal to the authentication device and not readily accessible outside of the authentication device. Next, the random number is cryptographically encoded 612 using key private key to produce an encoded number.

Thereafter, an authentication response is sent 614 to the host device. Here, the authentication response includes at least the encoded number and the device identifier. After the authentication response has been sent 614, a decision 616 determines whether access to features of the host device have been authorized. The decision 616 can be resolved actively or passively. For example, the host device might notify the accessory device that it has been authorized for access to one or more features of the host device. As another example, the host device may not notify the accessory device but might instead permit the accessory device to access the one or more features of the host device that are authorized. In any case, when the decision 616 determines that access to certain features on the host device have not been authorized, operation 620 of the accessory device, if any, is prevented from using the certain features of the host device. Indeed, in one embodiment, the host device can prevent any operation of the accessory device. As an example, the host device could prevent communication with the accessory device and/or cease supplying power to the accessory device.

On the other hand, when the decision 616 determines that access to certain features of the host device has been authorized, then the accessory device can be operated 618 in accordance with the authorized features. In other words, if authorized, the accessory device is able to interact with the host device to utilize the certain features supported by the host device.

Following the operations 618 and 620, a decision 622 determines whether the accessory device has been removed, i.e., whether the accessory device has been disconnected from the host device. When the decision 622 determines that the accessory device remains connected or attached to the host device, then the appropriate operations 618 or 620 can continue. Alternatively when the decision 622 determines that the accessory device has been removed, then the accessory device is no longer authorized to interact with the host device and thus can no longer utilized the previously authorized features supported by the host device. In this case, the accessory device processing 600 ends. However, the accessory device can be subsequently re-authorized by again performing the accessory device processing 600.

In the accessory device processing 600, the device identifier was provided with the authentication response. In an alternative embodiment, the device identifier can be provided to the host device differently, such as with the authentication information. The device identifier could also be separately provided to the host device.

Figure 6C:
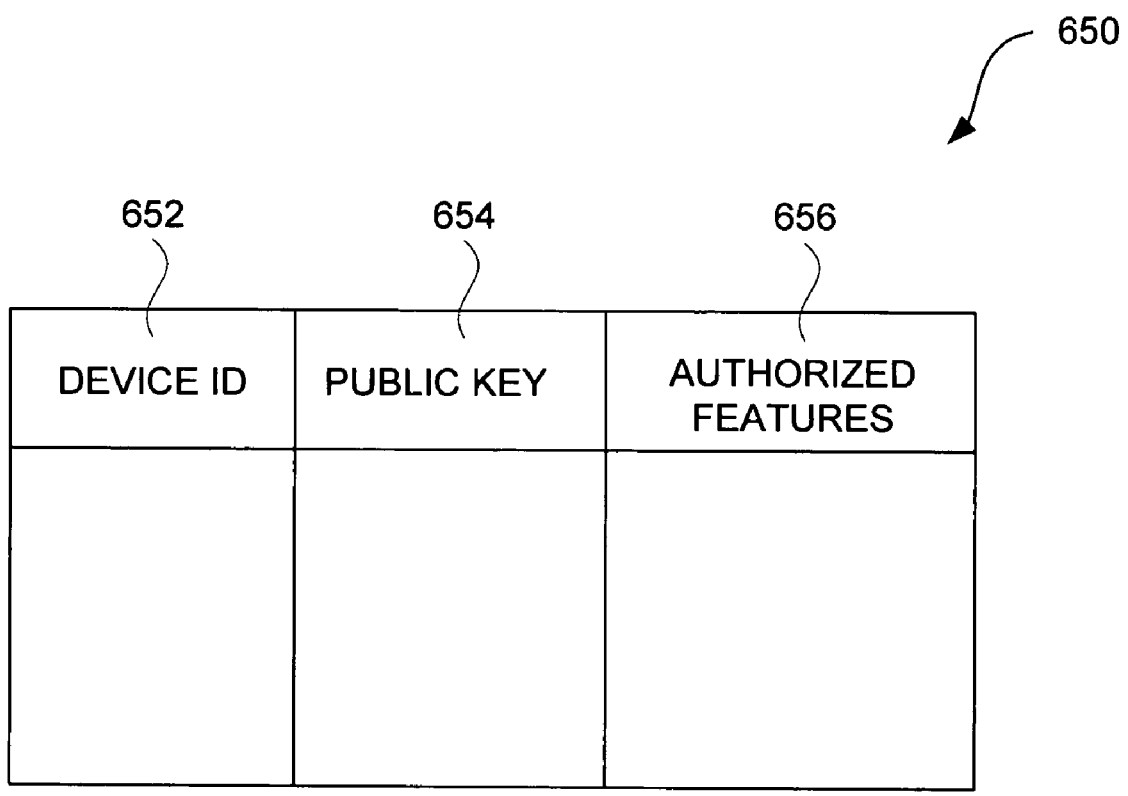
FIG. 6C is a diagram of an authorization table according to one embodiment of the invention.

FIG. 6C is a diagram of an authorization table 650 according to one embodiment of the invention. The authorization table is, for example, suitable for use as the authorization table 254 shown in FIG. 2B. In general, the authorization table 650 can be used to determine authorized features for a given accessory device. The authorization table 650 includes a device identifier column 652, a public key column 654, and an authorized features column 656. The authorization table 650 associates device identifiers, public keys and authorized features. Using a device identifier, the host device can determine an appropriate public key to be used when determining whether an accessory device identified using a particular device identifier can be authenticated. In the event that the authentication of the accessory device is successful, the authorized features associated with the device identifier can be identified in the authorized features column 656.

According to one aspect of the invention, a host device can operate to authenticate an accessory device being coupled to the host device. Those accessory devices that are able to be authenticated are permitted to interoperate with the host device to a greater extent. The host device can thus control the nature and degree by which accessory devices can interoperate with the host device. For example, the host device can limit, restrict or prevent accessory devices from interoperating with the host device when accessory devices are not able to be authenticated. Alternatively, the host device can enable greater interoperating with the host device when accessory devices are authenticated.

Figure 7A:
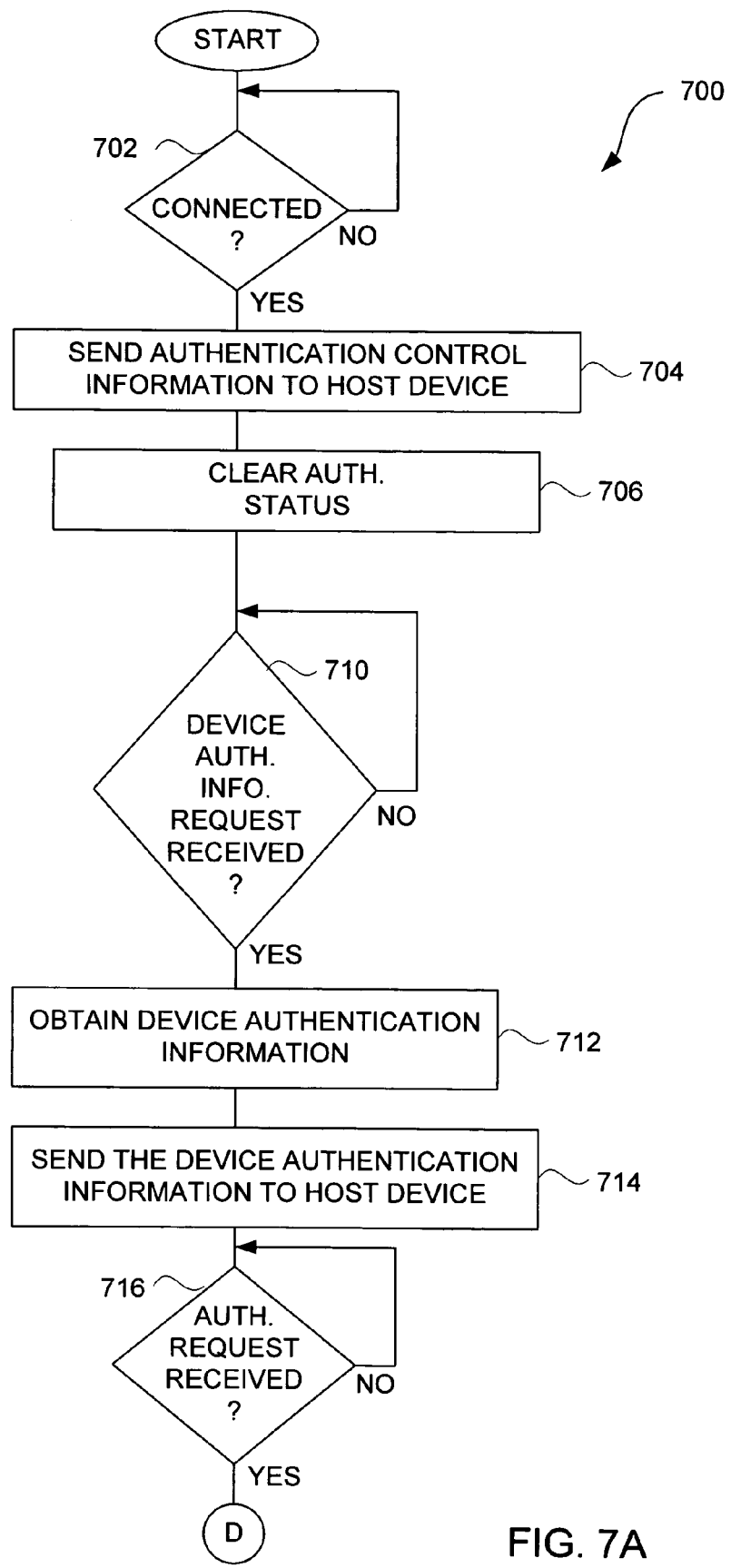
FIGS. 7A and 7B are flow diagrams of an accessory device process according to one embodiment of the invention.
Figure 7B:
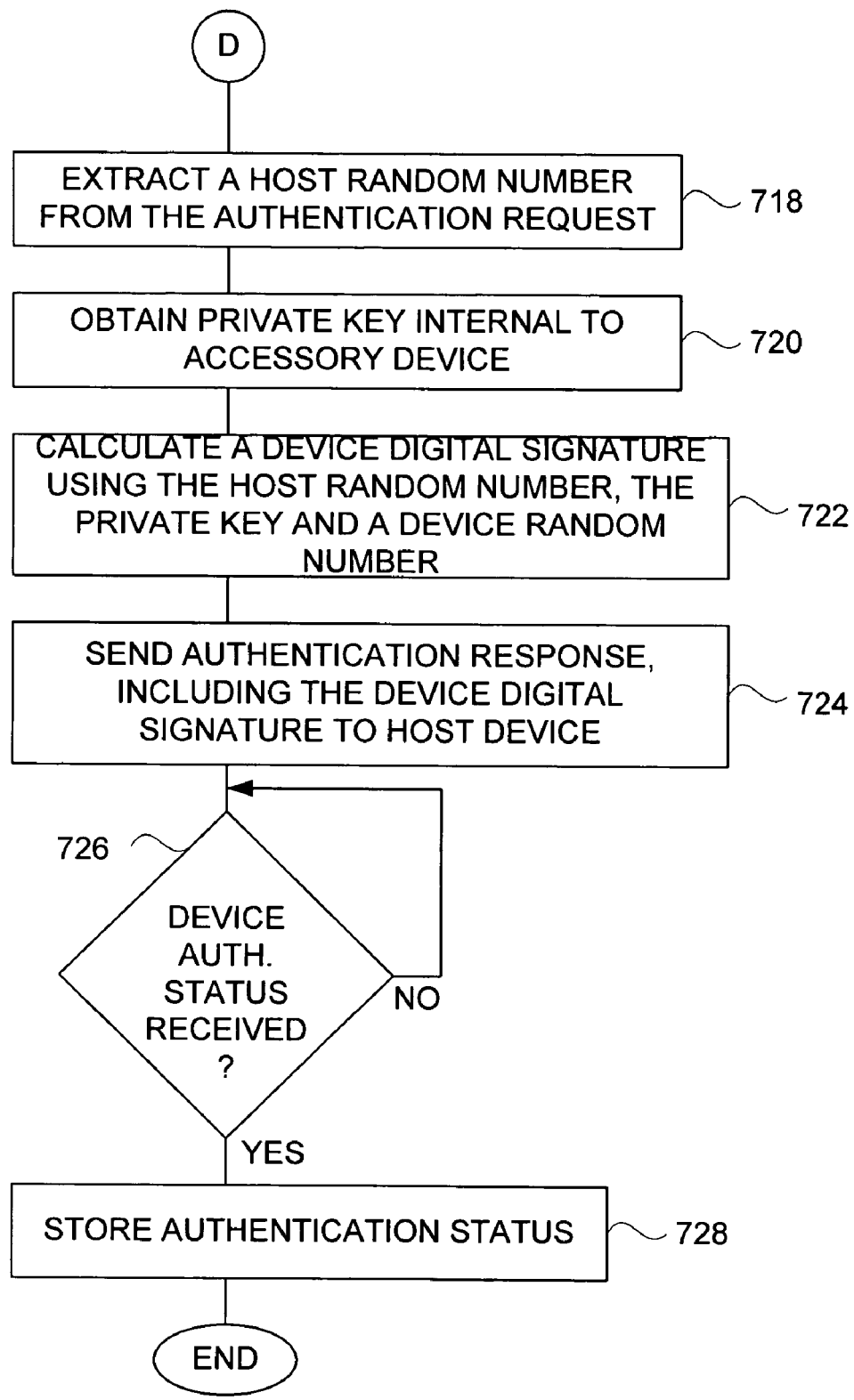
Figure 8A:
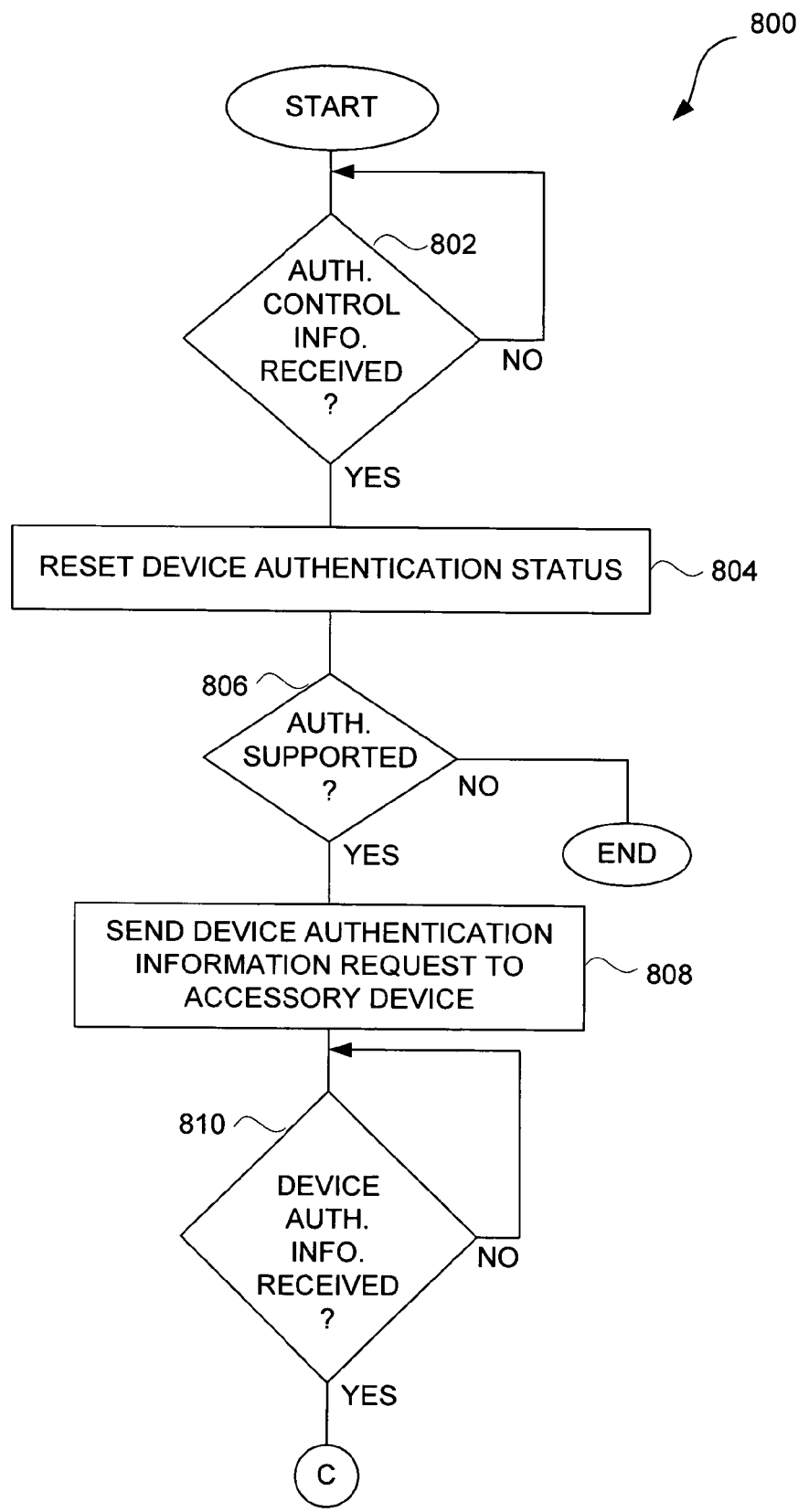
FIGS. 8A-8C are flow diagrams of a host device process according to one embodiment of the invention.
Figure 8B:
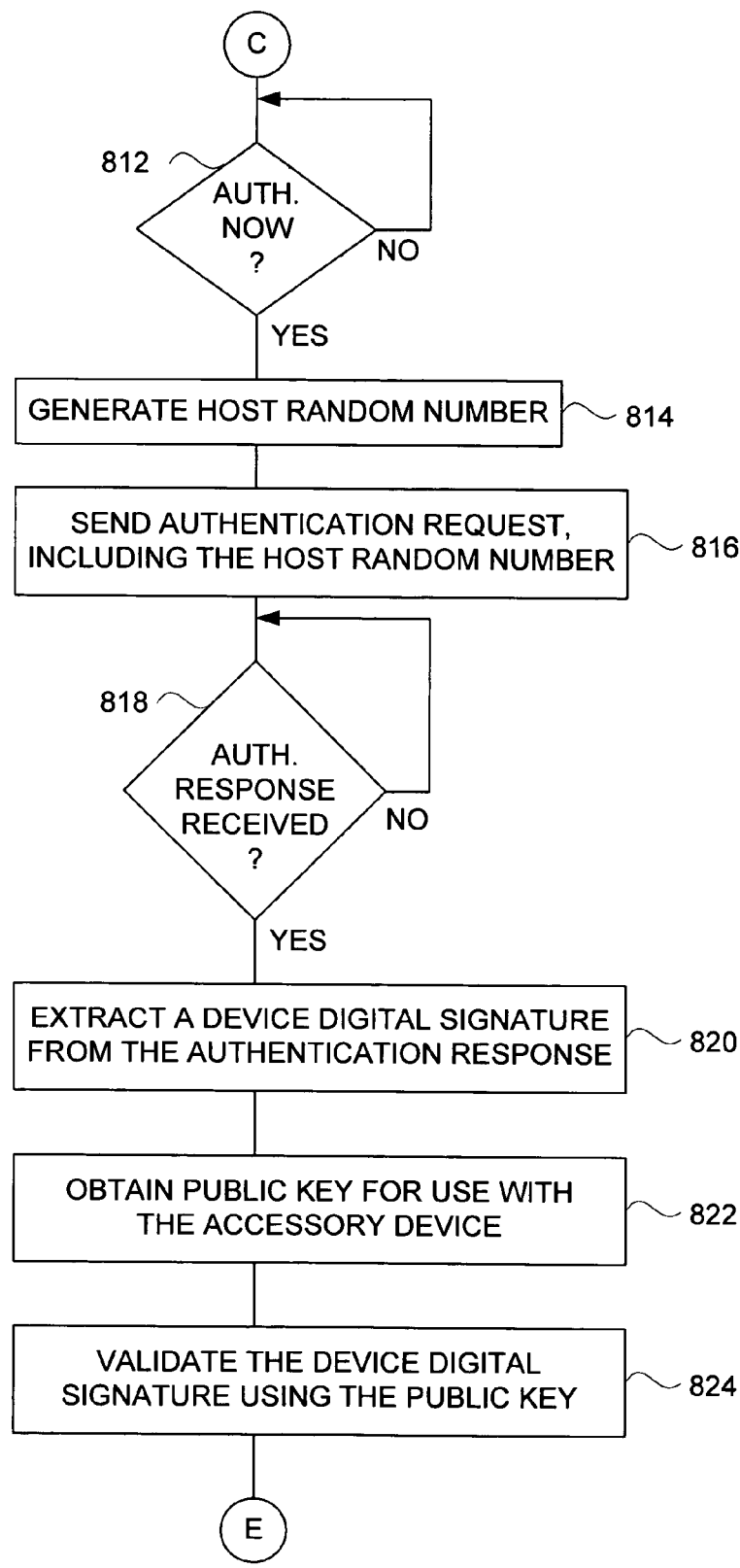
Figure 8C:
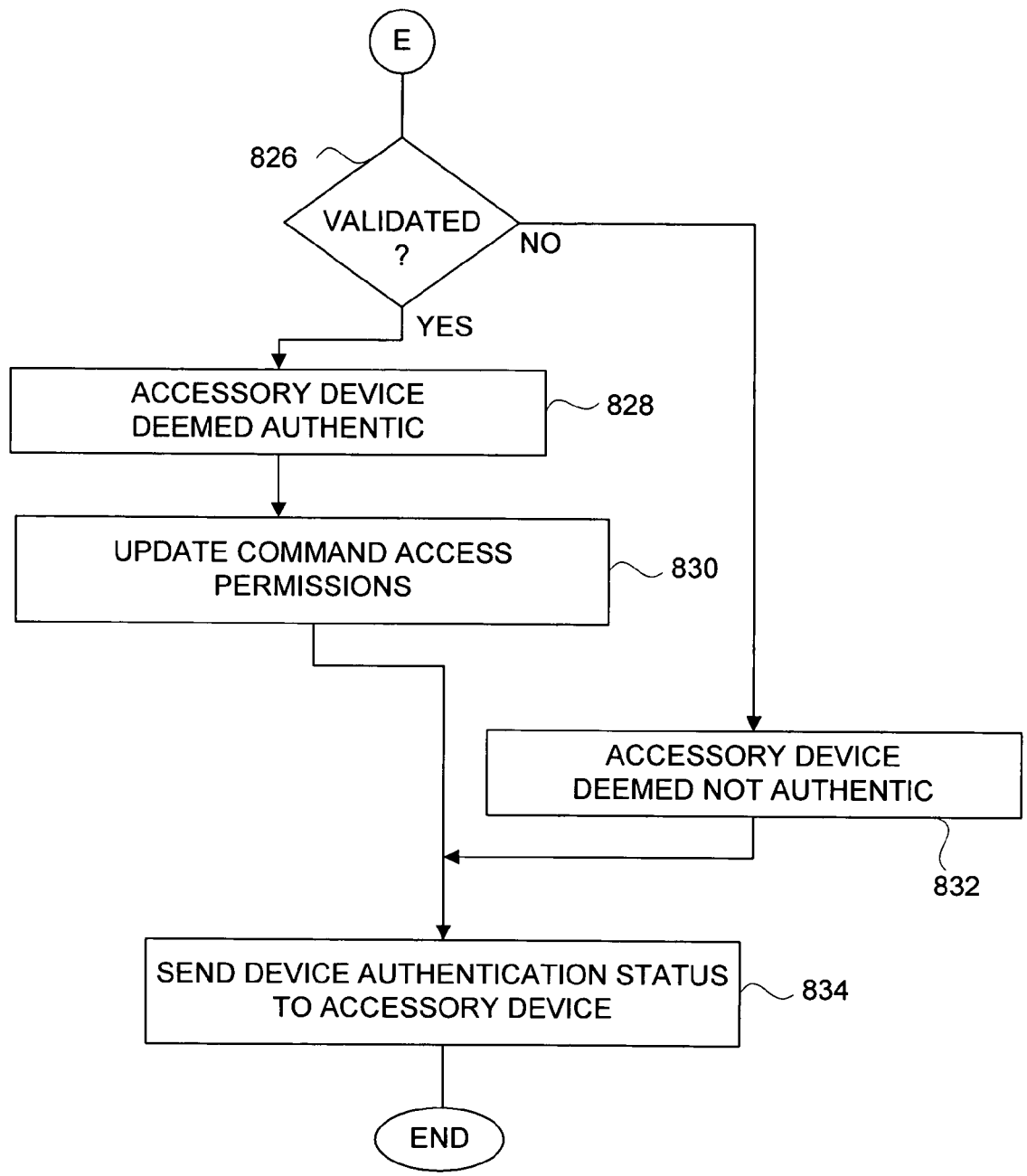

FIGS. 7A and 7B are flow diagrams of an accessory device process 700 according to one embodiment of the invention. FIGS. 8A-8C are flow diagrams of a host device process 800 according to one embodiment of the invention. The accessory device process 700 is performed by an accessory device during an authentication process with a host device. The host device process 800 is performed by the host device during the authentication process with the accessory process. The host device process 800 is a counterpart process to the accessory device process 700. In other words, during an authentication process, there is an exchange of information between the host device in the accessory device. Hence, FIGS. 7A and 7B represent processing performed by the accessory device and FIGS. 8A-8C represent processing performed by the host device, during one embodiment of an authentication process. It should be understood that although the authentication process depicted in these figures is illustrated as being substantially sequential, the authentication process can, in general, be considered a protocol utilized by an accessory device and a host device to exchange information for not only authentication but also subsequent operation. In one embodiment, such a protocol could be considered substantially parallel, such as in a client-server or master-slave implementation.

FIGS. 7A and 7B are flow diagrams of an accessory device process 700 according to one embodiment of the invention. The accessory device process 700 begins with a decision 702. The decision 702 determines whether an accessory device is connected to a host device. Typically, the decision 702 would detect the recent connection of the accessory device to the host device by way of a connector. In any case, when the decision 702 determines that the accessory device is not connected to the host device, the accessory device processing 700 can effectively await such a connection. In other words, the accessory device process 700 can be deemed invoked when the accessory device connects to the host device.

Once the decision 702 determines that the accessory device is connected to the host device, the accessory device process 700 continues. When the accessory device process 700 continues, authentication control information is sent 704 from the accessory device to the host device. As an example, the authentication control information can specify the type of accessory device, whether authentication is supported, when to authenticate, and/or power requirement of the accessory device. Specific examples of types of accessory devices are: microphone, simple remote, display remote, remote user interface, RF transmitter, and USB control host. The authentication status of the accessory device is cleared 706 on its on initiative or in response to a command or acknowledgement from the host device. Here, by clearing 706 the authentication status whenever an accessory device is connected, the accessory device can understand that it must be authenticated with the host device.

Next, a decision 710 determines whether a device authentication information request has been received. Here, the device authentication information request is sent to the accessory device by the host device. The device authentication information request serves to request certain information from the accessory device that will be utilized by the host device during the authentication process. When the decision 710 determines that a device authentication information request has not yet been received, the accessory device process 700 awaits such request. Once the decision 710 determines that a device authentication information request has been received, device authentication information is obtained 712 from the accessory device. As an example, the device authentication information can include a device identifier and a version indicator. The device identifier can pertain to a vendor identifier, a product identifier, or both. The version indicator can pertain to a protocol version that is supported. The device authentication information is then sent 714 the host device.

A decision 716 then determines whether an authentication request has been received from the host device. Here, the authentication request is a request from the host device to provide an authentication response containing a digital signature that is utilized to authenticate the accessory device. When the decision 716 determines that an authentication request has not been received, the accessory device process 700 awaits such request. Once the decision 716 determines that an authentication request has been received, a host random number is extracted 718 from the authentication request. The authentication request includes at least the host random number which is to be used in the authentication process.

A private key internal to the accessory device is then obtained 720. A device digital signature can then be calculated 722 using at least the host random number, the private key and a device random number. The device random number is generated or available within the accessory device. The device digital signature is an encrypted value that will be used by the host device to authenticate the accessory device. An authentication response is then sent 724 to the host device. The authentication response is formed such that it includes at least the device digital signature.

A decision 726 then determines whether device authentication status has been received from the host device. When the decision 726 determines that device authentication status has not been received, the accessory device process 700 awaits such information. Once the decision 726 determines that the device authentication status has been received, the device authentication status can be stored 728 on the accessory device. Following the block 728, the accessory device process 700 ends.

FIGS. 8A-8C are flow diagrams of a host device process 800 according to one embodiment of the invention. The host device process 800 begins with a decision 802 that determines whether authentication control information has been received from an accessory device. When the decision 802 determines that authentication control information has not been received, the host device process 800 awaits such information. Once the decision 802 determines that authentication control information has been received, the host device process 800 continues. In other words, the host device processing 800 is effectively invoked once authentication control information is received.

When the host device process 800 continues, the device authentication status can be reset (i.e., cleared) 804. Thus, the accessory device is deemed unauthentic until the authentication process is able to authenticate the accessory device. This operation may have already occurred automatically at the host device, such as when an accessory device is disconnected from the host device.

A decision 806 then determines whether the accessory device supports authentication based on the authentication control information. When the decision 806 determines that authentication is not supported by the accessory device, the host device processing 800 ends without having authenticated the accessory device. In this case, the accessory device may be restricted, even prevented, from interoperating with the host device.

On the other hand, when the decision 806 determines that authentication is supported by the accessory device, the host device process 800 continues. At this point, a device authentication information request is sent 808 to the accessory device. A decision 810 then determines whether device authentication information has been received. When the decision 810 determines that device authentication information has not been received, the host device process 800 awaits such information is received. Once the decision 810 determines that device authentication information has been received, a decision 812 determines whether authentication should be performed at this time. Here, it should be understood that the host device process 800 can perform authentication proximate to when the accessory device is connected to the host device, or the authentication can be deferred until a later point in time, such as periodically when the accessory device desires (e.g., first desires) to use extended features of the host device which are only available to an authenticated device. Hence, when the decision 812 determines that authentication is not immediately required, the host device process 800 can await the appropriate time to perform the authentication process. Once the decision 812 determines that authentication should be performed, a host random number is generated 814. Next, an authentication request is sent 816 to the accessory device. The authentication request includes at least the host random number that has been generated 814.

A decision 818 then determines whether an authentication response has been received from the accessory device. When the decision 818 determines that an authentication response has been received, a device digital signature is extracted 820 from the authentication response. A public key is also obtained 822 for use with the accessory device. In one embodiment, the host device includes a plurality of public keys that are associated with different device identifiers. Hence, the device authentication information from the accessory device can include a device identifier for the accessory device. The device identifier can be utilized in obtaining 822 the public key for use with the accessory device. As an example, an authentication table, such as the authentication table 650 shown in FIG. 6C, can be used to obtain the public key.

Next, the device digital signature is validated 824 using the public key. In one embodiment, the validation 824 of the digital device signature also makes use of the host random number. A decision 826 then determines whether the digital device signature has been validated. When the decision 826 determines that the device digital signature has been validated, the accessory device is deemed 828 authentic. Command access permissions associated with the accessory device can then be updated 830 so that the host device permits the accessory device to use those commands that are permitted by authenticated devices. On the other hand, when the decision 826 determines that the digital device signature has not been validated, the accessory device is deemed 832 not authentic. Following the blocks 830 and 832, device authentication status is sent 834 to the accessory device. The device authentication status serves to inform the accessory device as to whether or not the host device has authenticated the accessory device.

It the device authentication status indicates that the accessory device is deemed authentic, then the accessory device can proceed to interact with the host device in accordance with an authorized degree of the usage. As another example, when the device authentication status indicates that the accessory device is deemed not authentic, then the accessory device can be restricted, even prevented, from interaction with the host device. In any case, the authorized degree of usage of the accessory device with the host device is greater when the accessory device is deemed authentic.

Figure 9A:
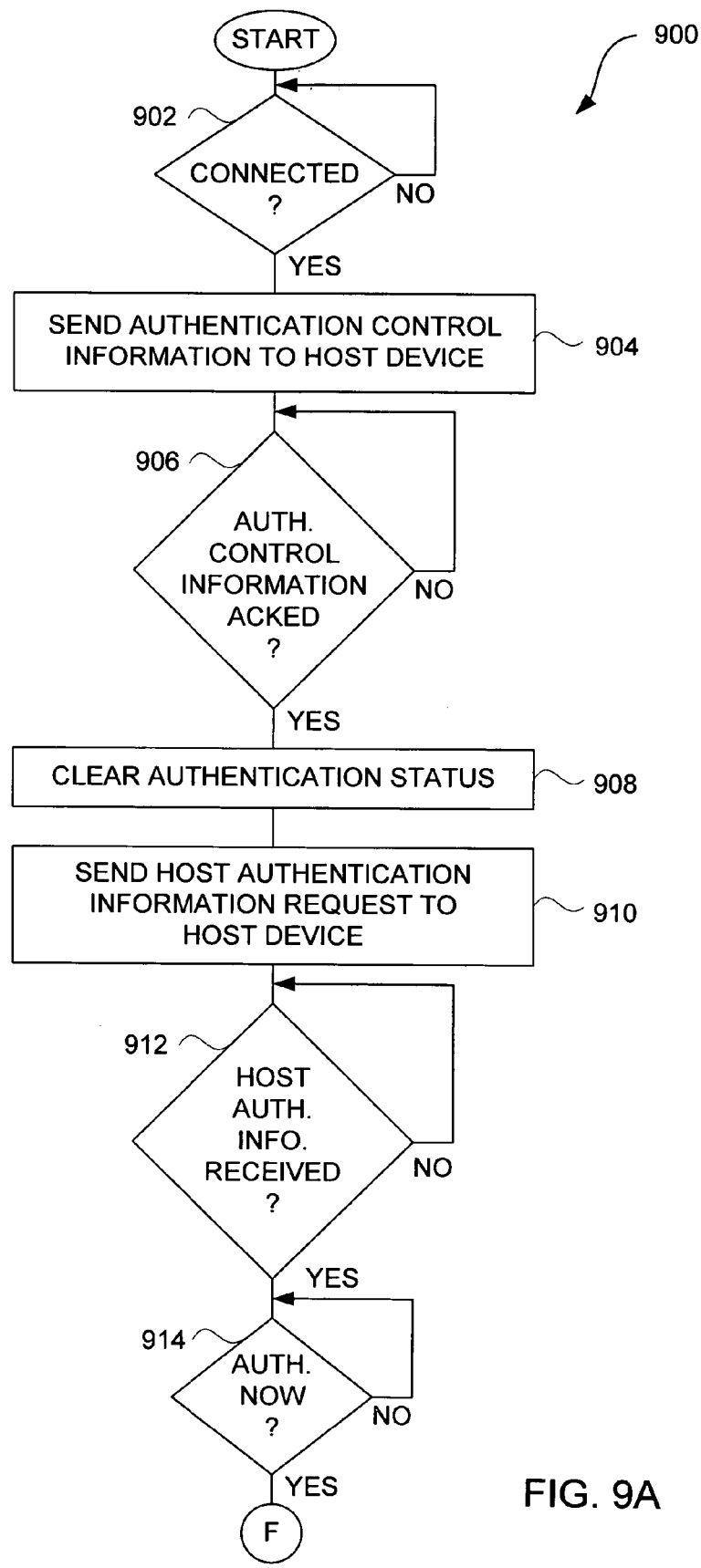
FIGS. 9A-9C are flow diagrams of an accessory device process according to one embodiment of the invention.
Figure 9B:
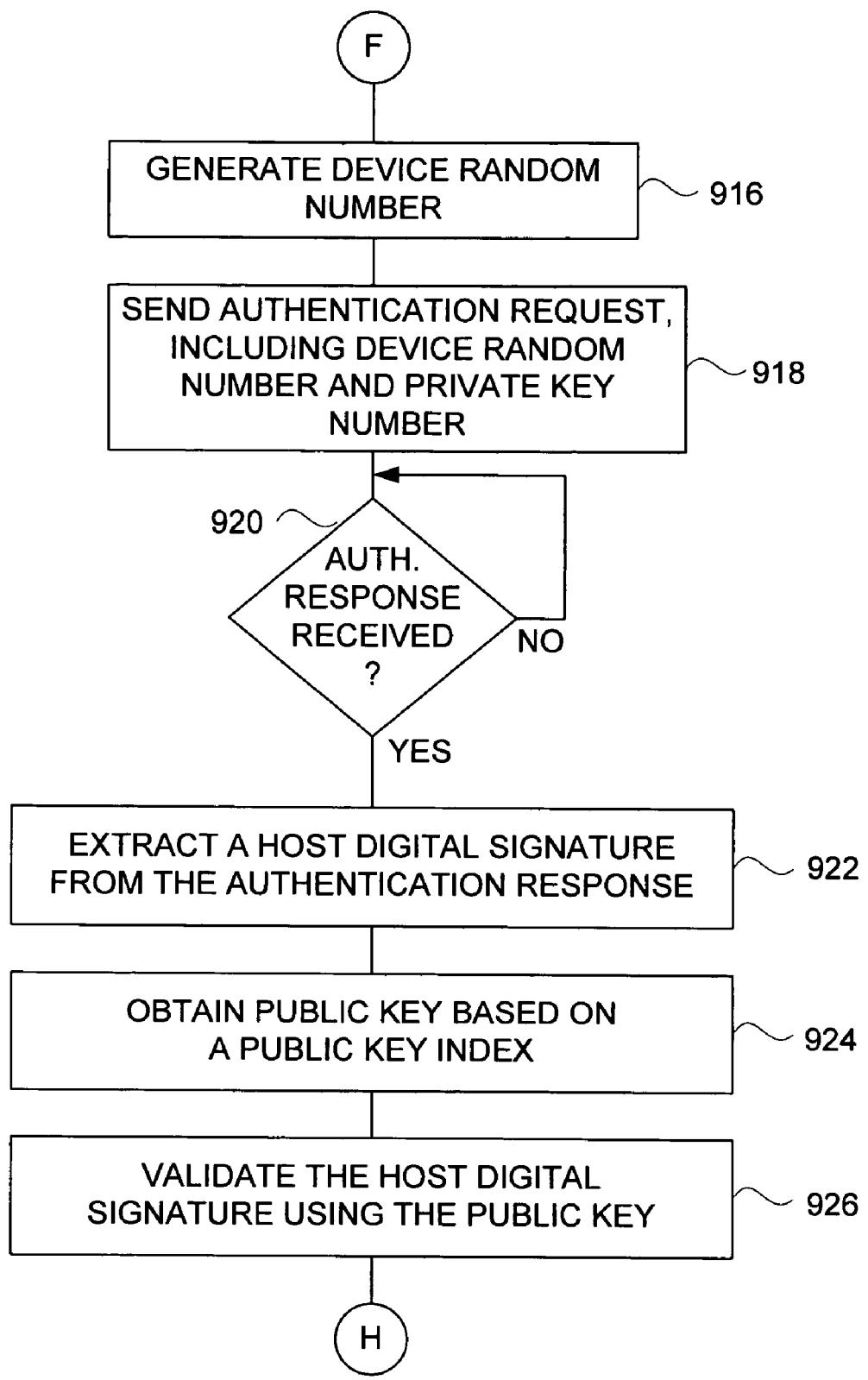
Figure 9C:
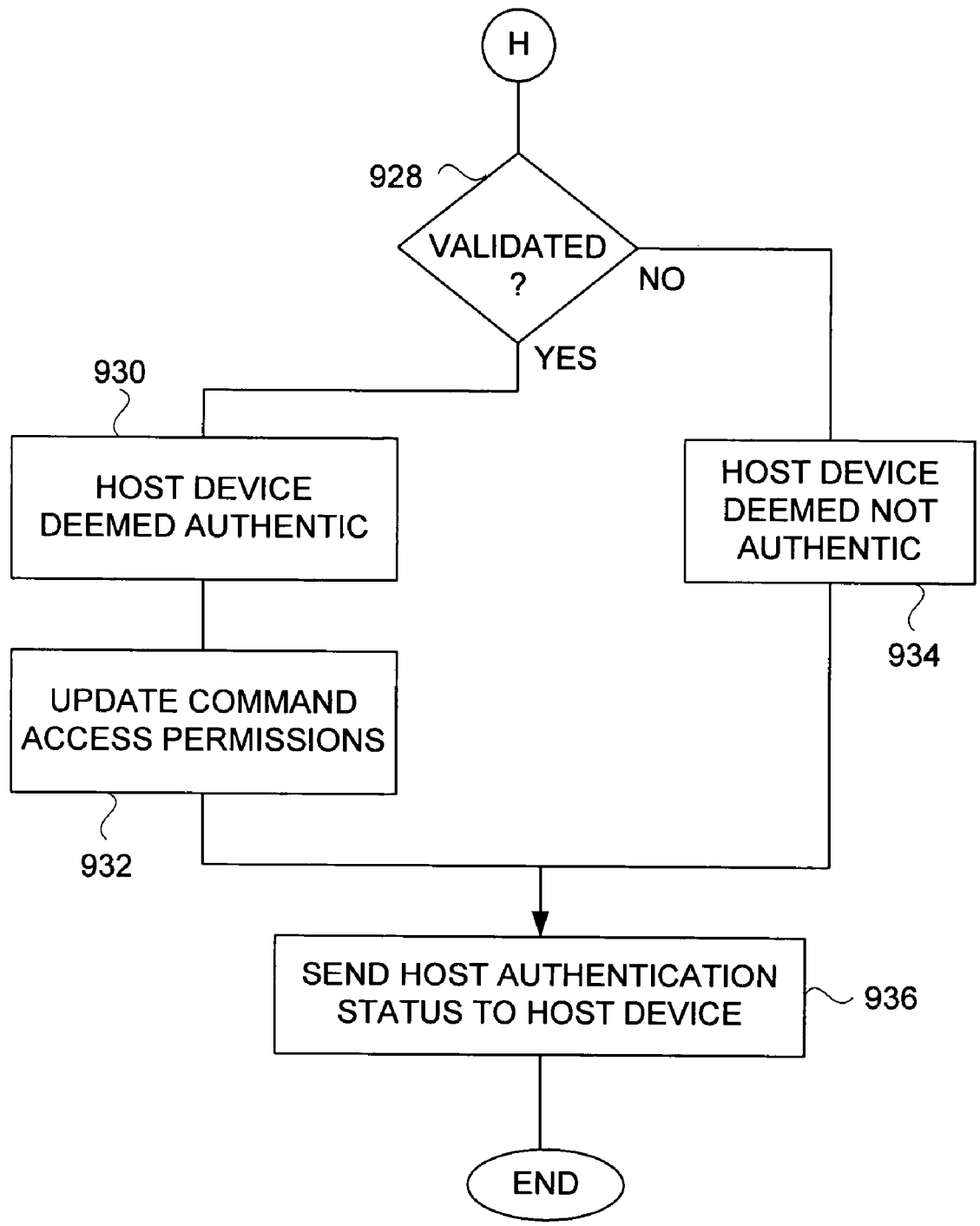
Figure 10A:
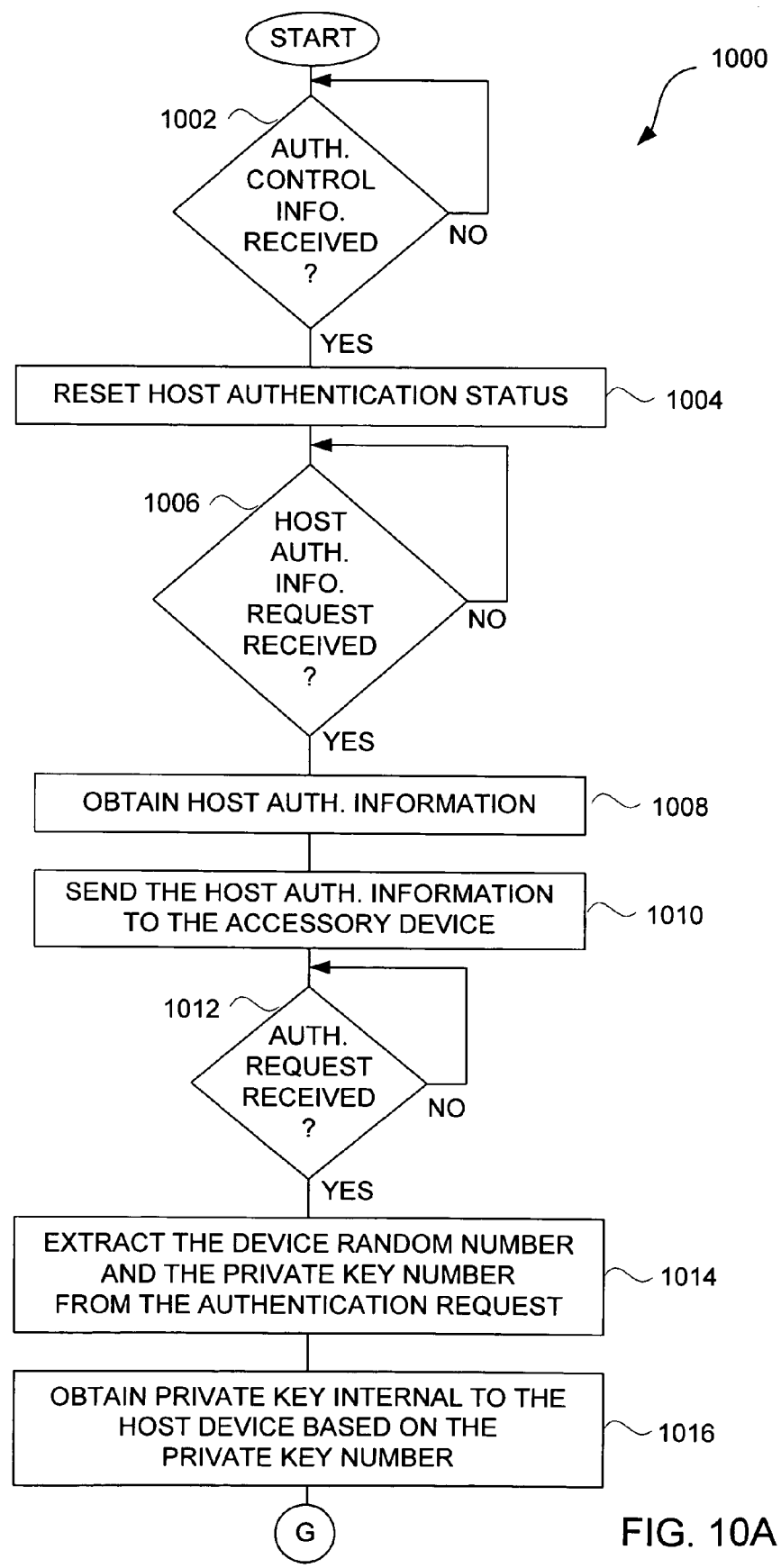
FIGS. 10A and 10B are flow diagrams of a host device process according to one embodiment of the invention.
Figure 10B:
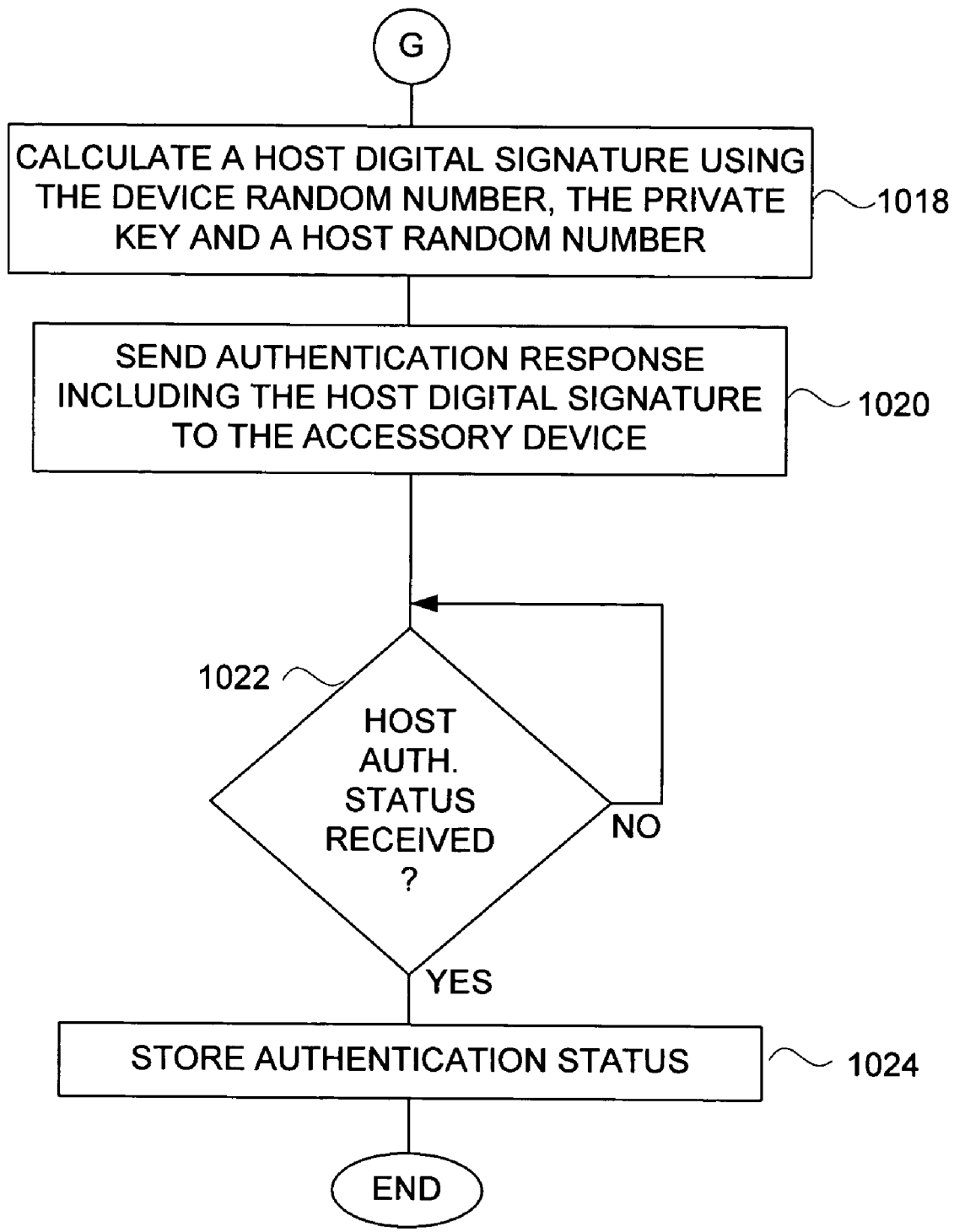

FIGS. 9A-9C are flow diagrams of an accessory device process 900 according to one embodiment of the invention. FIGS. 10A and 10B are flow diagrams of a host device process 1000 according to one embodiment of the invention. The accessory device process 900 is performed by an accessory device during an authentication process when seeking to authenticate a host device. The host device process 1000 is performed by the host device during the authentication process with the accessory process. The host device process 1000 is a counterpart process to the accessory device process 900. In other words, during an authentication process, there is an exchange of information between the host device in the accessory device. Hence, FIGS. 9A-9C represent processing performed by the accessory device and FIGS. 10A and 10B represent processing performed by the host device, during one embodiment of an authentication process. It should be understood that although the authentication process depicted in these figures is illustrated as being substantially sequential, the authentication process can be considered a protocol utilized by an accessory device and a host device to exchange information for not only authentication but also subsequent operation. In one embodiment, such a protocol could be considered substantially parallel, such as in a client-server or master-slave implementation.

FIGS. 9A-9C are flow diagrams of an accessory device process 900 according to one embodiment of the invention. The accessory device process 900 is performed by an accessory device when seeking to authenticate a host device connected with the accessory device.

The accessory device process 900 begins with a decision 902 that determines whether the accessory device is connected to the host device. When the decision 902 determines that the accessory device is not connected to the host device, the accessory device process 900 awaits such a connection. In other words, the accessory device process 900 is effectively invoked when the accessory device is connected to the host device. In one embodiment, the accessory device 900 is invoked once it is determined that an accessory device has just recently connected to the host device. However, in other embodiments, the authentication process can be performed later (e.g., deferred).

Once the decision 902 determines that the accessory device is connected to the host device, authentication control information is sent 904 to the host device. A decision 906 then determines whether the authentication control information has been acknowledged. When the decision 906 determines that the authentication control information has been acknowledged, authentication status of the accessory device can be cleared 908. Here, by clearing 908 the authentication status, whenever the host device is connected, it is authenticated by the accessory device.

Next, a host authentication information request is sent 910 to the host device. A decision 912 then determines whether host authentication information has been received from the host device. When the decision 912 determines that host authentication information has not been received from the host device, the accessory device process 900 awaits such information.

Once the decision 912 determines that the host authentication information has been received, a decision 914 determines whether authentication should be performed at this time. Here, it should be noted that the authentication process can be performed immediately, such as soon after the connection has been detected, or can be deferred until a later point in time, such as when commands or extended functionality of the host device are requested. In any case, when the decision 914 determines that authentication is not to be performed at this time, the accessory device process 900 can await the appropriate time to performed the authentication.

Once the decision 914 determines that authentication should be performed, a device random number is generated 916. Then, an authentication request is sent 918 to the host device. The authentication request typically includes at least the device random number and a private key number. The private key number is used to select a private key at the host device.

Next, a decision 920 determines whether an authentication response has been received from the host device. When the decision 920 determines that an authentication response has not been received, then the accessory device process 900 awaits such a response. Once the decision 920 determines that an authentication response has been received, a host digital signature is extracted 922 from the authentication response. Also, a public key is obtained 924 based on a public key index. In one embodiment, the public key index is provided to the accessory device with the host authentication information. In one embodiment, the public key is determined at the accessory device using the public key index. For example, the accessory device can include a plurality of different public keys, and the appropriate one of the public keys to be utilized can be identified by the public key index.

The host digital signature is then validated 926 using the public key. The validation 926 may also make use of the device random number. Thereafter, a decision 928 determines whether the host digital signature has been validated. When the decision 928 determines that the host digital signature has been validated, the host device is deemed 930 to be authentic. Consequently, command access permissions for use by the host device are updated 932. For example, since the host device is validated, the interaction between the host device and the accessory device is deemed authorized, at least to the extent of the command access permissions. Alternatively, when the decision 928 determines that the host device is not validated, the host device is deemed 934 to be not authentic. Following the blocks 932 and 934, host authentication status can be sent 936 to the host device. Here, the host authentication status informs the host device of the results of the authentication process. Following the blocks 936, the accessory device process 900 is complete and ends.

FIGS. 10A and 10B are flow diagrams of host device processing 1000 according to one embodiment of the invention. The host device processing 1000 is performed on a host device while interacting with an accessory device. The host device processing 1000 represents counterpart processing to the accessory device process 900 during an authentication process.

The host device processing 1000 begins with a decision 1002 that determines whether authentication control information from the accessory device has been received. When the decision 1002 determines that authentication control information has not been received, the host device processing 1000 awaits such information. Once the decision 1002 determines that authentication control information has been received, the host device processing 1000 continues. In other words, the host device processing 1000 is effectively invoked once authentication control information from the accessory device is received.

When the host device processing 1000 continues, the host authentication status is reset 1004, thereby clearing any prior authentication status it may have. Then, a decision 1006 determines whether a host authentication information request has been received. When the decision 1006 determines that a host authentication information request has not been received, the host device processing 1000 awaits such request. Once the decision 1006 determines that a host authentication information request has been received, host authentication information is obtained 1008 at the host device. The host authentication information is then send 1010 to the accessory device. In one embodiment, the host authentication information includes at least version information and a public key index.

Next, a decision 1012 determines whether an authentication request has been received. When the decision 1012 determines that an authentication request has not been received, the host device processing 1000 awaits such request. Once the decision 1012 determines that an authentication request has been received, the device random number and a private key number are extracted 1014 from the authentication request. In this embodiment, it is understood that the authentication request being received from the accessory device includes at least the device random number and the private key number that can be utilized by the host device. Then, a private key is obtained 1016 based on the private key number. Here, the private key being obtained 1016 is internal to the host device and identified through use of the private key number.

A host digital signature is then calculated 1018 using the device random number, the private key and a host random number. The host random number can be generated or available at the host device. The host device process 1000 then sends 1020 an authentication response to the accessory device. The authentication response includes at least the host digital signature.

Thereafter, a decision 1022 determines whether a host authentication status has been received. When the decision 1022 determines that the host authentication status has not been received, the host device processing 1000 awaits such information. Once the decision 1022 determines that the host authentication status has been received, the authentication status is stored 1024 at the host device. At this point, the host device understands the authentication status it has with the accessory device and can operate accordingly. Following the block 1024, the host device processing 1000 is complete and ends.

According to another aspect of the invention, an electronic device, or host device, can also connect to a host computer, such as a personal computer. The personal computer can store, utilize and manage media items. The management of the media items can be not only for the host computer but also for the electronic device.

Figure 11:
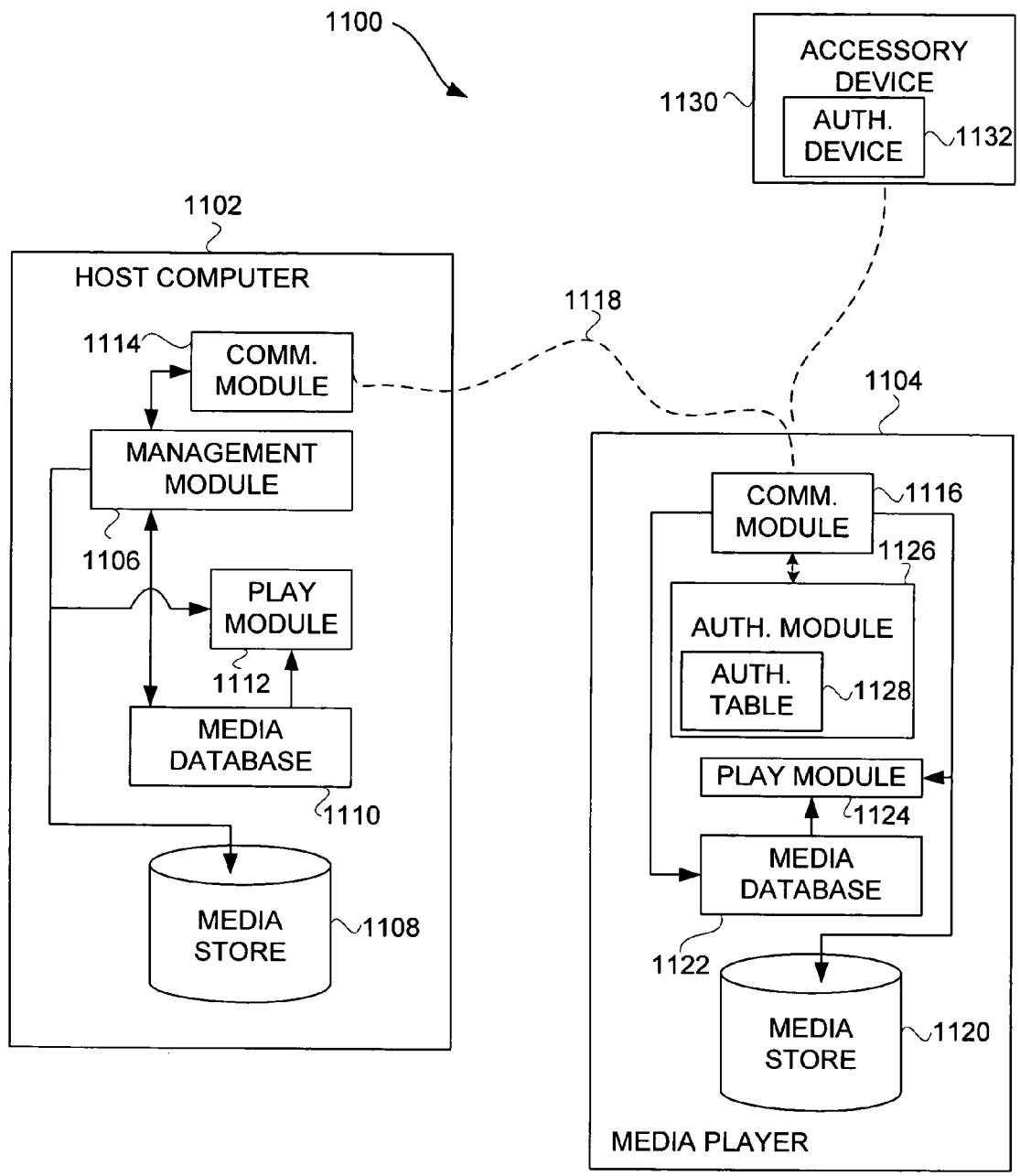
FIG. 11 is a block diagram of a media management system according to one embodiment of the invention.

FIG. 11 is a block diagram of a media management system 1100 according to one embodiment of the invention. The media management system 1100 includes a host computer 1102 and a media player 1104. The host computer 1102 is typically a personal computer. The host computer, among other conventional components, includes a management module 1106 which is a software module. The management module 1106 provides for centralized management of media items (and/or playlists) not only on the host computer 1102 but also on the media player 1104. More particularly, the management module 1106 manages those media items stored in a media store 1108 associated with the host computer 1102. The management module 1106 also interacts with a media database 1110 to store media information associated with the media items stored in the media store 1108.

The media information pertains to characteristics or attributes of the media items. For example, in the case of audio or audiovisual media, the media information can include one or more of: title, album, track, artist, composer and genre. These types of media information are specific to particular media items. In addition, the media information can pertain to quality characteristics of the media items. Examples of quality characteristics of media items can include one or more of: bit rate, sample rate, equalizer setting, volume adjustment, start/stop and total time.

Still further, the host computer 1102 includes a play module 1112. The play module 1112 is a software module that can be utilized to play certain media items stored in the media store 1108. The play module 1112 can also display (on a display screen) or otherwise utilize media information from the media database 1110. Typically, the media information of interest corresponds to the media items to be played by the play module 1112.

The host computer 1102 also includes a communication module 1114 that couples to a corresponding communication module 1116 within the media player 1104. A connection or link 1118 removably couples the communication modules 1114 and 1116. In one embodiment, the connection or link 1118 is a cable that provides a data bus, such as a FIREWIRE™ bus or USB bus, which is well known in the art. In another embodiment, the connection or link 1118 is a wireless channel or connection through a wireless network. Hence, depending on implementation, the communication modules 1114 and 1116 may communicate in a wired or wireless manner.

The media player 1104 also includes a media store 1120 that stores media items within the media player 1104. Optionally, the media store 1120 can also store data, i.e., non-media item storage. The media items being stored to the media store 1120 are typically received over the connection or link 1118 from the host computer 1102. More particularly, the management module 1106 sends all or certain of those media items residing on the media store 1108 over the connection or link 1118 to the media store 1120 within the media player 1104. Additionally, the corresponding media information for the media items that is also delivered to the media player 1104 from the host computer 1102 can be stored in a media database 1122. In this regard, certain media information from the media database 1110 within the host computer 1102 can be sent to the media database 1122 within the media player 1104 over the connection or link 1118. Still further, playlists identifying certain of the media items can also be sent by the management module 1106 over the connection or link 1118 to the media store 1120 or the media database 1122 within the media player 1104.

Furthermore, the media player 1104 includes a play module 1124 that couples to the media store 1120 and the media database 1122. The play module 1124 is a software module that can be utilized to play certain media items stored in the media store 1120. The play module 1124 can also display (on a display screen) or otherwise utilize media information from the media database 1122. Typically, the media information of interest corresponds to the media items to be played by the play module 1124.

According to one embodiment, to support an authentication process on the media player 1104, the media player 1104 can further include an authentication module 1126 and an authentication table 1128. In one implementation, the authentication module 1126 and the authentication table 1128 can respectively correspond to the authentication module 252 and the authentication table 254 described above with reference to FIG. 2B.

As previously noted, an accessory device can couple to a media player. Hence, FIG. 11 also illustrates an accessory device 1130 capable of coupling to the media player 1104. According to one embodiment, the accessory device 1130 can further include an authentication device 1132. The authentication device 1132 operates to support the authentication process on the media player 1104 according to one embodiment. In one implementation, the authentication device 1132 can correspond to the authentication controller 200 described above with reference to FIG. 2A.

In one embodiment, the media player 1104 has limited or no capability to manage media items on the media player 1104. However, the management module 1106 within the host computer 1102 can indirectly manage the media items residing on the media player 1104. For example, to "add" a media item to the media player 1104, the management module 1106 serves to identify the media item to be added to the media player 1104 from the media store 1108 and then causes the identified media item to be delivered to the media player 1104. As another example, to "delete" a media item from the media player 1104, the management module 1106 serves to identify the media item to be deleted from the media store 1108 and then causes the identified media item to be deleted from the media player 1104. As still another example, if changes (i.e., alterations) to characteristics of a media item were made at the host computer 1102 using the management module 1106, then such characteristics can also be carried over to the corresponding media item on the media player 1104. In one implementation, the additions, deletions and/or changes occur in a batch-like process during synchronization of the media items on the media player 1104 with the media items on the host computer 1102.

In another embodiment, the media player 1104 has limited or no capability to manage playlists on the media player 1104. However, the management module 1106 within the host computer 1102 through management of the playlists residing on the host computer can indirectly manage the playlists residing on the media player 1104. In this regard, additions, deletions or changes to playlists can be performed on the host computer 1102 and then by carried over to the media player 1104 when delivered thereto.

As previously noted, synchronization is a form of media management. The ability to automatically initiate synchronization was also previously discussed above and in the related application noted above. Still further, however, the synchronization between devices can be restricted so as to prevent automatic synchronization when the host computer and media player do not recognize one another.

According to one embodiment, when a media player is first connected to a host computer (or even more generally when matching identifiers are not present), the user of the media player is queried as to whether the user desires to affiliate, assign or lock the media player to the host computer. When the user of the media player elects to affiliate, assign or lock the media player with the host computer, then a pseudo-random identifier is obtained and stored in either the media database or a file within both the host computer and the media player. In one implementation, the identifier is an identifier associated with (e.g., known or generated by) the host computer or its management module and such identifier is sent to and stored in the media player. In another implementation, the identifier is associated with (e.g., known or generated by) the media player and is sent to and stored in a file or media database of the host computer.

Figure 12:
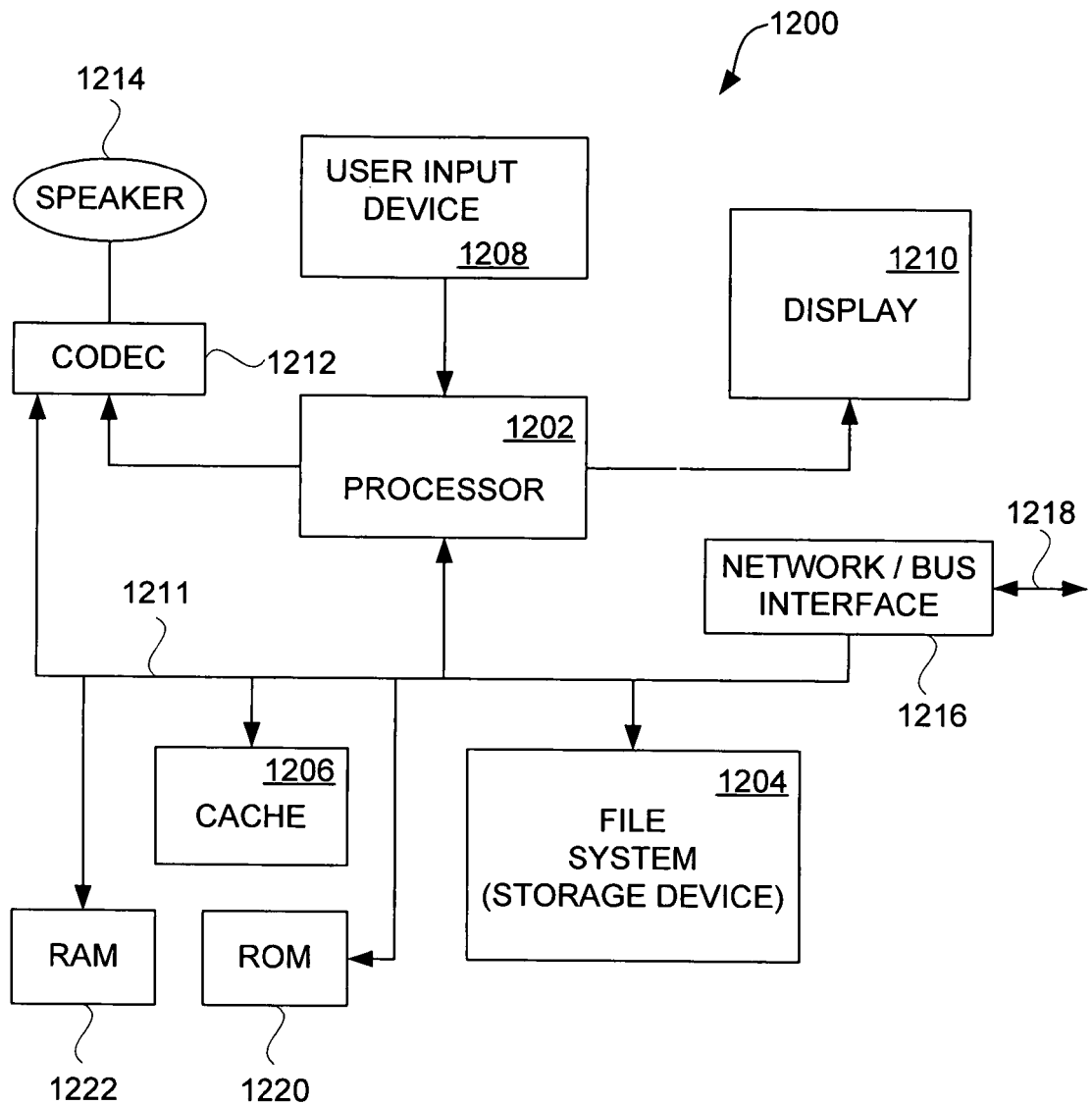
FIG. 12 is a block diagram of a media player according to one embodiment of the invention.

FIG. 12 is a block diagram of a media player 1200 according to one embodiment of the invention. The media player 1200 includes a processor 1202 that pertains to a microprocessor or controller for controlling the overall operation of the media player 1200. The media player 1200 stores media data pertaining to media items in a file system 1204 and a cache 1206. The file system 1204 is, typically, a storage device. The file system 1204 typically provides high capacity storage capability for the media player 1200. For example, the storage device can be semiconductor-based memory, such as FLASH memory. The file system 1204 can store not only media data but also non-media data (e.g., when operated in a data mode). However, since the access time to the file system 1204 is relatively slow, the media player 1200 can also include a cache 1206. The cache 1206 is, for example, Random-Access Memory (RAM) provided by semiconductor memory. The relative access time to the cache 1206 is substantially shorter than for the file system 1204. However, the cache 1206 does not have the large storage capacity of the file system 1204. Further, the file system 1204, when active, consumes more power than does the cache 1206. The power consumption is often a concern when the media player 1200 is a portable media player that is powered by a battery (not shown). The media player 1200 also includes a RAM 1220 and a Read-Only Memory (ROM) 1222. The ROM 1222 can store programs, utilities or processes to be executed in a non-volatile manner. The RAM 1220 provides volatile data storage, such as for the cache 1206. In one embodiment, the ROM 1220 and the RAM 1222 can be provided by the storage device providing the file system 1204.

The media player 1200 also includes a user input device 1208 that allows a user of the media player 1200 to interact with the media player 1200. For example, the user input device 1208 can take a variety of forms, such as a button, keypad, dial, etc. Still further, the media player 1200 includes a display 1210 (screen display) that can be controlled by the processor 1202 to display information to the user. The user input device 1208 and the display 1210 can also be combined in the case of a touch screen. A data bus 1211 can facilitate data transfer between at least the file system 1204, the cache 1206, the processor 1202, and the CODEC 1212.

In one embodiment, the media player 1200 serves to store a plurality of media items (e.g., songs) in the file system 1204. When a user desires to have the media player play a particular media item, a list of available media items is displayed on the display 1210. Then, using the user input device 1208, a user can select one of the available media items. The processor 1202, upon receiving a selection of a particular media item, supplies the media data (e.g., audio file) for the particular media item to a coder/decoder (CODEC) 1212. The CODEC 1212 then produces analog output signals for a speaker 1214. The speaker 1214 can be a speaker internal to the media player 1200 or external to the media player 1200. For example, headphones or earphones that connect to the media player 1200 would be considered an external speaker.

The media player 1200 also includes a network/bus interface 1216 that couples to a data link 1218. The data link 1218 allows the media player 1200 to couple to a host computer or to accessory devices. The data link 1218 can be provided over a wired connection or a wireless connection. In the case of a wireless connection, the network/bus interface 1216 can include a wireless transceiver.

In one implementation, the host computer can utilize an application resident on the host computer to permit utilization and provide management for playlists, including a media device playlist. One such application is iTunes®, version 4.2, produced by Apple Computer, Inc. of Cupertino, Calif.

The media items (media assets) can pertain to one or more different types of media content. In one embodiment, the media items are audio tracks. In another embodiment, the media items are images (e.g., photos). However, in other embodiments, the media items can be any combination of audio, graphical or video content.

The above discussion makes reference to random number used with cryptographic approaches to authenticate an accessory device or a host device. The cryptographic approaches discussed above can make use of random numbers, public-private key pairs and authentication algorithms. The random numbers can also be referred to as random digests. The public-private key pairs and authentication algorithms can utilize public-key cryptographic systems, such as the well known RSA algorithm or an Elliptic Curve Cryptography (ECC) algorithm. It may be advantageous to use an ECC algorithm that offers reduced memory consumption with relatively smaller keys (e.g., 160 bits) as compared to larger keys (e.g., 1024 bits) as is typical for RSA implementations. An example of a reduced memory ECC algorithm is described in the related U.S. patent application Ser. No.: 11/051,441, filed Feb. 3, 2005, entitled "SMALL MEMORY FOOTPRINT FAST ELLIPTIC ENCRYPTION," which has been incorporated herein by reference.

The various aspects, embodiments, implementations or features of the invention can be used separately or in any combination.

The invention can be implemented by software, hardware, or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The advantages of the invention are numerous. Different aspects, embodiments or implementations may yield one or more of the following advantages. One advantage of the invention is that control over accessory interaction with a host device can be controlled. As a result, an electronic device can limit usage of some or all of its features to only those accessory devices that are deemed authorized. Another advantage of the invention is that it provides the ability to manage quality of those accessory device that are permitted to be utilized with host devices. By managing quality of accessory devices, the operation of an electronic device is less likely tarnished by the attachment of an inferior accessory device. Still another advantage of the invention is that an authentication process can control access to certain features of electronic devices on a manufacturer or device basis.

The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described.

Hence, all suitable modifications and equivalents may be resorted to as falling within the scope of the invention.

What is claimed is:

1. An accessory device for a portable electronic device, comprising:
    an input/output port for interacting with the portable electronic device;
    an authentication algorithm;
    an authentication key associated with said accessory device;
    an authentication controller, operatively connected to said input/output port, for performing authentication operations using at least said authentication algorithm and said authentication key; and
    accessory circuitry configured to access a limited set of functions of the portable electronic device through the input/output port in response to a failed authentication and the accessory circuitry being configured to access a full set of functions of the portable electronic device through the input/output port in response to a successful authentication, wherein the limited set of functions includes fewer functions than the full set of functions, and wherein the limited set of functions includes at least one function,
    wherein said authentication key is a private key, said authentication controller encrypts a value received from the portable electronic device using said private key, and performs the authentication operations by providing the encrypted value to said portable electronic device via said input/output port.

2. The accessory device as recited in claim 1, wherein the authentication operations serve to authenticate said accessory device to the portable electronic device.

3. The accessory device as recited in claim 2, wherein said accessory device further comprises:
    a device identifier associated with said accessory device.

4. The accessory device as recited in claim 1, wherein at least said authentication key, said authentication algorithm and said authentication controller are within a single integrated circuit chip.

5. The accessory device as recited in claim 1, wherein the encrypted value is a digital signature.

6. The accessory device as recited in claim 1, wherein said accessory device is a peripheral adapter, and
    wherein said accessory circuitry includes at least a voltage booster to receive a first voltage level and to output a second voltage level, the first voltage level is received from said portable electronic device when said accessory device is connected to said portable electronic device, and the second voltage level is output when said accessory device has been authenticated by said portable electronic device.

7. The accessory device as recited in claim 1, wherein said accessory device is a peripheral device for said portable electronic device.

8. The accessory device as recited in claim 7, wherein the peripheral device is a media device.

9. The accessory device as recited in claim 1, wherein the portable electronic device is a media player configured to store and play media items.

10. The accessory device as recited in claim 9, wherein the media items pertain to music and the media player is a music player.

11. A method for authorizing an accessory device for use with an electronic device, the method being performed by the accessory device, said method comprising:
    (a) receiving a random number from the electronic device;
    (b) encrypting the random number using at least a private key provided within the accessory device, thereby producing an encrypted value;
    (c) performing authentication operations by sending the encrypted value and a device identifier to the electronic device through an input/output port; and
    (d) subsequent to act (c), accessing a limited set of authorized functions at the electronic device through the input/output port in response to a failed authentication result and accessing a full set of authorized functions at the electronic device through the input/output port in response to a successful authentication result, wherein the limited set of authorized functions includes fewer functions than the full set of functions, and wherein the limited set of authorized functions includes at least one function.

12. The method as recited in claim 11, wherein said method further comprises:
    (e) operating of the accessory device with the electronic device in a limited manner when the accessory device is not authorized by the electronic device.

13. The method as recited in claim 11, wherein the electronic device is a portable electronic device.

14. The method as recited in claim 11, wherein the portable electronic device is a media player.

15. The method as recited in claim 11, further comprising receiving an indication from the electronic device that the accessory device is authenticated.

16. The method as recited in claim 15, wherein the indication received from the electronic device indicates which functions of the electronic device are included in the set of features accessible by the accessory device.

17. An accessory device comprising:
    communication means for communicating with a portable media player;
    authentication means for authenticating the accessory device with the portable media player through the communication means, wherein authentication encrypts a random number received from the portable media player using a private key provided within the accessory device and transmits the encrypted random number to the portable media player through the communication means; and
    operation means for executing a limited set of functions at the portable media player through the communication means, wherein the functions within the limited set of functions are authorized based on a failed authentication performed by the authentication means and for executing a full set of functions at the portable media player through the communication means, wherein the functions within the full set of functions are authorized based on a successful authentication performed by the authentication means, wherein the limited set of functions includes at least one function.

18. An accessory device comprising:
    a device identifier;
    communication means for communicating with a portable media player;
    authentication means for authenticating the accessory device with the portable media player, wherein authentication encrypts a random number received from the portable media player using a private key provided within the accessory device and transmits the encrypted random number to the portable media player through the communication means; and operation means for executing a limited set of functions at the portable media player through the communication means in the event the authentication fails, wherein the functions within the limited set of functions depend at least on the device identifier, and for executing a full set of functions at the portable media player through the communication means in the event the authentication succeeds, wherein the functions within the full set of functions depend at least on the device identifier, and wherein the limited set of functions includes at least one function.

19. The accessory device according to claim 18, wherein the device identifier is communicated to the portable media player through the communications means.

20. The accessory device according to claim 18, wherein said authentication means includes at least one of an authentication key, an authentication algorithm or an authentication controller.

21. The accessory device according to claim 18, wherein said authentication means comprises a single integrated circuit chip.

22. The accessory device according to claim 18, further comprising a voltage booster to receive a first voltage level and to output a second voltage level through the communication means, the first voltage level is received when said accessory device is connected with a portable electronic device, and the second voltage level is output when said accessory device has been authenticated by said portable electronic device.

23. The accessory device according to claim 17, wherein said authentication means includes at least one of an authentication key, an authentication algorithm or an authentication controller.

24. The accessory device according to claim 17, wherein said authentication means comprises a single integrated circuit chip.

25. The accessory device according to claim 17, further comprising a voltage booster to receive a first voltage level and to output a second voltage level through the communication means, the first voltage level is received when said accessory device is connected with a portable electronic device, and the second voltage level is output when said accessory device has been authenticated by said portable electronic device.

26. A computer program product comprising a non-transitory computer readable medium encoded with program code for controlling operation of an electronic device, the program code including:
 program code for receiving a random number from the electronic device;
 program code for encrypting the random number using at least a private key provided within an accessory device, thereby producing an encrypted value;
 program code for performing authentication operations by sending the encrypted value and a device identifier to the electronic device through an input/output port; and
 program code for accessing a limited set of authorized functions at the electronic device through the input/output port in response to a failed authentication result and accessing a full set of authorized functions at the electronic device through the input/output port in response to a successful authentication result subsequent to sending the encrypted value and device identifier, wherein the limited set of functions includes at least one function.

27. The computer program product recited in claim 26, further comprising program code for operating the accessory device with the electronic device in a limited manner when the accessory device is not authorized by the electronic device.

28. The computer program product recited in claim 26, wherein the electronic device is a portable electronic device.

29. The computer program product recited in claim 26, wherein the portable electronic device is a media player.

30. The computer program product recited in claim 26, further program code for receiving an indication from the electronic device that the accessory device is authenticated.

31. The computer program product recited in claim 30, wherein the indication received from the electronic device indicates which functions of the electronic device are included in the set of features accessible by the accessory device.

* * * * *

UNITED STATES PATENT AND TRADEMARK OFFICE
CERTIFICATE OF CORRECTION

| | | |
|---|---|---|
| PATENT NO. | : 7,823,214 B2 | |
| APPLICATION NO. | : 11/051499 | |
| DATED | : October 26, 2010 | |
| INVENTOR(S) | : Jonathan Jake Rubinstein et al. | |

It is certified that error appears in the above-identified patent and that said Letters Patent is hereby corrected as shown below:

Title page 4, Col. 2, under "Other Publications", line 33, delete "Colloquim" and insert -- Colloquium --, therefor.

On sheet 7 of 25, in Figure 4A, Box 406, line 4, delete "AUTENTICATION" and insert -- AUTHENTICATION --, therefor.

In column 1, line 10-11, delete "reference;" and insert -- reference. --, therefor.

In column 8, line 7, delete "substantially-prevented." and insert -- substantially prevented. --, therefor.

Signed and Sealed this
Fifteenth Day of November, 2011

David J. Kappos
*Director of the United States Patent and Trademark Office*